(12) United States Patent
Hughes et al.

(10) Patent No.: US 7,533,723 B2
(45) Date of Patent: May 19, 2009

(54) WELL BORE TREATMENT FLUID

(75) Inventors: Trevor Lloyd Hughes, Cambridge (GB); Timothy Gareth John Jones, Cottenham (GB); Loic Regnault de la Mothe, Cambridge (GB); Robert Seth Hartshorne, Newmarket (GB); Sarah Elizabeth Pelham, Cambridge (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 162 days.

(21) Appl. No.: 10/574,298

(22) PCT Filed: Oct. 8, 2004

(86) PCT No.: PCT/GB2004/004251

§ 371 (c)(1),
(2), (4) Date: Nov. 28, 2006

(87) PCT Pub. No.: WO2005/035936

PCT Pub. Date: Apr. 21, 2005

(65) Prior Publication Data

US 2007/0095534 A1    May 3, 2007

(30) Foreign Application Priority Data

Oct. 9, 2003    (GB)    .................................. 0323648.6

(51) Int. Cl.
*E21B 43/27*    (2006.01)
*E21B 33/13*    (2006.01)

(52) U.S. Cl. ..................... 166/300; 166/292; 166/305.1; 166/281

(58) Field of Classification Search ....................... None
See application file for complete search history.

(56) References Cited

U.S. PATENT DOCUMENTS 2,842,206 A    7/1958    Bearden et al.

(Continued)

FOREIGN PATENT DOCUMENTS

EP    1 041 242 A1    10/2000

(Continued)

OTHER PUBLICATIONS

Zaitoun& Kohler, 'Two-phase flow through porous media: Effect of an adsorbed polymer layer', SPE paper 18085, SPE Technical Conference, Texas USA, Oct. 1988.

(Continued)

*Primary Examiner*—Zakiya W Bates
*Assistant Examiner*—Angela M DiTrani
(74) *Attorney, Agent, or Firm*—Jody Lynn DeStefanis; Steven Gahlings; James McAleenan

(57) ABSTRACT

A well bore treatment fluid and methods for selectively reducing the outflow of water during recovery of hydrocarbons from a hydrocarbon reservoir in a formation are described, wherein fluid contains 5 to 40 weight per cent of a dissolved compound based on α-branched carboxylic acid, derivatives or co-polymers thereof, and capable of forming a precipitate that is substantially soluble in hydrocarbons and substantially insoluble in water.

36 Claims, 16 Drawing Sheets

U.S. PATENT DOCUMENTS

| | | | |
|---|---|---|---|
| 2,858,892 | A | 11/1958 | Carpenter |
| 3,404,734 | A | 10/1968 | Raifsnider et al. |
| 3,695,356 | A | 10/1972 | Argabright et al. |
| 3,719,228 | A | 3/1973 | Garcia |
| 3,797,575 | A | 3/1974 | Dill et al. |
| 3,859,107 | A | 1/1975 | Garcia |
| 3,866,685 | A | 2/1975 | Friedman |
| 3,979,304 | A | 9/1976 | Fischer et al. |
| 3,979,305 | A | 9/1976 | Fischer et al. |
| 3,989,632 | A | 11/1976 | Fischer et al. |
| 4,127,174 | A | 11/1978 | Sharpe et al. |
| 4,183,406 | A | 1/1980 | Lundberg et al. |
| 4,191,249 | A | 3/1980 | Sarem |
| 4,192,753 | A | 3/1980 | Pye et al. |
| 4,352,396 | A | 10/1982 | Friedman |
| 4,476,931 | A | 10/1984 | Boles et al. |
| 4,525,285 | A | 6/1985 | Son et al. |
| 4,739,834 | A | 4/1988 | Peiffer et al. |
| 5,346,013 | A | 9/1994 | Pusch et al. |
| 5,711,900 | A | 1/1998 | Jones |
| 5,735,349 | A | 4/1998 | Dawson et al. |
| 5,979,557 | A | 11/1999 | Card et al. |
| 6,001,280 | A | 12/1999 | Jones |
| 6,133,204 | A | 10/2000 | Newhouse et al. |
| 6,194,356 | B1 | 2/2001 | Jones et al. |
| 6,228,812 | B1 | 5/2001 | Dawson et al. |
| 6,232,274 | B1 | 5/2001 | Hughes et al. |
| 6,419,017 | B1 | 7/2002 | Metcalf et al. |
| 2002/0023752 | A1 | 2/2002 | Qu et al. |
| 2003/0132033 | A1 | 7/2003 | Jones et al. |

FOREIGN PATENT DOCUMENTS

| | | |
|---|---|---|
| GB | 2 335 428 A | 9/1999 |
| GB | 2 348 447 A | 10/2000 |
| GB | 2 382 829 A | 6/2003 |
| WO | 02/11873 A1 | 2/2002 |

OTHER PUBLICATIONS

Senol et al 'Design and field application of chemical gels for water control in oil wells producing from naturally fractured carbonated reservoirs', SPE paper 17949, SPE Middle East Oil Technical Conference, Bahrain, Mar. 1989.

Kohler& Zaitoun 'Polymer treatment for water control in high-temperature production wells', SPE paper 21000, SPE International Symposium, California USA, 1991.

Seright& Liang, 'A survey of field applications of gel treatments for water shutoff', SPE paper 26991, Latin American/Caribbean Engineering Conference, Argentina, 1994.

Zitha et al 'Permeability- dependent propagation of polyacrylamides under near-wellbore flow conditions', SPE paper 28955, SPE International Symposium, Texas USA, 1995.

Ranjbar et al 'Comparative laboratory selection and field testing of polymers for selective control of water production in gas wells', SPE paper 28984, SPE International Symposium, Texas USA, 1995.

Barreau et al 'Water control in producing wells: Influence of an adsorbed- polymer layer on relative permeabilities and capillary pressure', SPE paper 35447, SPE/ DOE Symposium on Improved Oil Recovery, Oklahoma USA, 1996.

Chen Tielong et al 'A relative permeability modifier for water control of gas wells in a low- permeability reservoir', SPE paper 35617, SPE Gas Technology Symposium, Calgary Canada, 1996.

Bryant et al 'Polymer gelants for high temperature water shutoff applications', SPE journal 36911, SPE European Petroleum Conference, Milan Italy, 1997.

Liang& Seright 'Further investigations of why gels reduce water permeability more than oil permeability', SPE paper 37249, SPE International Symposium, Houston USA, 1997.

Mennella et al 'Pore-scale mechanism for selective permeability reduction by polymer injection', SPE journal 39634, SPE/DOE Improved Oil Recovery Symposium, Oklahoma USA, 1998.

Sydansk& Southwell 'More than 12 years of experience with a successful conformance-control polymer gel technology', SPE paper 49315, SPE Annual Technical Conference, New Orleans USA, 1998.

Al-Sharji et al 'Pore-scale study of the flow of oil and water through polymer gels', SPE paper 56738, SPE Annual Technical Conference, Texas USA, 1999.

Bai et al 'Selective water shutoff technology study and application of W/O emulsions', SPE paper 59320, SPE/DOE Improved Oil Recovery Symposium, Oklahoma USA, 2000.

Dalrymple et al 'Studies of a relative permeability modifier treatment performed using multitap flow cells', SPE paper 59346, SPE/DOE Improved Oil Recovery Symposium, Oklahoma USA, 2000.

Liang& Seright 'Wall-effect/ gel-droplet model of disproportionate permeability reduction', SPE paper 59344, SPE/DOE Improved Oil Recovery Symposium, Oklahoma USA, 2000.

Denys et al 'Bridging adsorption of cationic polyacrylamides in porous media', SPE paper 64984, SPE International Symposium, Texas USA, 2001.

Botermans et al 'Relative permeability modifiers: myth or reality?', SPE paper 68973, SPE European Formation Damage Conference, The Netherlands, 2001.

Nieves et al 'Field application of relative permeability modifier in Venezuela', SPE paper 75123, SPE/DOE Improved Oil Recovery Symposium, Oklahoma USA, 2002.

Singleton et al 'Further development of the pore scale mechanism of relative permeability modification by partially hydrolysed polyacrylamide', SPE paper 75184, SPE/DOE Improved Oil Recovery Symposium, Oklahoma USA, 2002.

Liang et al 'Gel placement in production wells', SPE Production and Facilities 276, 1993 (SPE 20211).

Liang et al 'Why do gels reduce water permeability more than oil permeability?', SPE Reservoir engineering, SPE 27829, Nov. 1995, pp. 282-286.

Zaitoun, 'Preparation of a water control polymer treatment at conditions of high temperature and salinity', Journal of Petroleum Science and Engineering (1992), p. 67-75.

Elphick, 'A classification of water problem types', 3rd International Conference on Reservoir Conformance, USA (1997).

Stavland et al 'Improved oil productivity by selective water control', Recent Advances in Enhanced Oil and Gas Recovery, Ed. I. Lakatos, Budapest: Akademiai Kiado (2001), Progress in Mining and Oilfield Chemistry, vol. 3, p. 101-114.

Jonsson et al 'Use of surfactants as emulsifiers', Surfactants and Polymers in Aqueous Solution, Chichester: John Wiley & Sons (1998), Ch 17, pp. 351-363.

Zinkel et al 'Naval Stores, Production, chemistry, utilization', Pulp Chemicals Association, NY (1989), p. 688-694.

G

G'

G + G'(levopimaric acid) + H ⟶ I'

I'

K

WELL BORE TREATMENT FLUID

CROSS-REFERENCE TO RELATED APPLICATIONS

This application claims the benefits of priority from:
i) Application Number 0323648.6, entitled "WELL BORE TREATMENT FLUID," filed in the United Kingdom on Oct. 9, 2003; and
ii) Application Number PCT/GB2004/004251, entitled "WELL BORE TREATMENT FLUID," filed under the PCT on Oct. 8, 2004;
All of which are commonly assigned to assignee of the present invention and hereby incorporated by reference in their entirety.

FIELD OF THE INVENTION

The present invention relates to well bore treatment fluids for selectively reducing water production from a hydrocarbon reservoir, and methods of using such fluids in relation to recovery of hydrocarbons from subterranean formations.

BACKGROUND

In most oil wells, water enters the well and is recovered together with the oil. Furthermore, as the well ages the amount or cut of recovered water generally increases. As the world's oilfields mature, there is an increasing focus on the development of systems to manage/process large quantities of water co-produced with the hydrocarbons and methods to reduce water production without reducing hydrocarbon production. Typically, the co-production of large quantities of water reduces the ultimate recovery of hydrocarbons from a well, increases the cost and size of the equipment used to separate the water from the hydrocarbons and increases the operating costs associated with disposing of the water in an environmentally acceptable manner. Various other problems can be associated with the co-production of large quantities of water; these include an increased tendency for the formation of emulsions, increased sand production, accelerated corrosion and scale deposition in tubulars and surface equipment.

Multi-layered reservoirs present particular water-production problems for-hydrocarbon recovery. A multi-layered reservoir consists of a number of oil-producing zones through which the bore is driven. Problems occur where one or more layers in the formation are "watered out", producing fluid with a high water/oil ratio at an excessive rate.

A water-producing or watered-out zone or layer is a part of the formation that produces fluid with a high water/oil ratio. The large amounts of water in such zones make it economically inefficient to recover any oil that may also be present in those zones. However, there may be oil-rich layers nearby from which it is desirable to recover oil.

Water coning is another problem. Coning occurs where the upper boundary of a water-rich zone is located close beneath the bottom of the bore hole. Water can be sucked up or "coned" from below into the bore, resulting in potentially large volumes of water being co-produced as oil is drawn from the zones above. It may be that the bottom perforations of the bore hole are too close to the oil-water contact.

A classification of the main water problem types was presented by Elphick and Seright in: Elphick J., Seright, R., A classification of water control problem types, Presentation at the PNEC 3rd International Conference on Reservoir Conformance, Profile Control, Water and Gas Shut off, Houston, Tex., USA 1997. For certain problem types and in situations where the source of the unwanted water production can be defined and where appropriate mechanical isolation methods can be implemented, the conventional "water shut off" approach has been to deliver a non-selective blocking fluid which will block the flow of water (and oil) from the target watered-out layer/zone into which it is placed. Typically, such fluids are delayed polymer gel formulations which evolve from an easily injectable low viscosity pre-gel polymer solution during placement to a rigid crosslinked polymer gel capable of resisting flow in the near wellbore environment.

Several different approaches have been pursued in the development of selective fluid treatments. Typically, a selective fluid treatment involves the injection of a fluid or sequence of fluids into the near wellbore region of a producer well such that the treatment enters both the target watered out zone(s) and non-target oil-rich zone(s). When the well is put back on production, the treatment selectively reduces the rate of water production without reducing the rate of oil production. Such a treatment is required for situations where a sufficient diagnosis of the source of the unwanted water is prohibitively expensive and/or the watered out layers/zones cannot be isolated due to high intervention costs or well geometry constraints.

One selective fluid approach, extensively researched in recent years, is the use of relative permeability modifiers (RPMs); these are sometimes termed disproportionate permeability reducers (DPMs). In general, RPMs are water-soluble polymers which, when applied as a polymer solution or crosslinked gel, selectively reduce water permeability more than they reduce oil permeability. The most widely used RPM polymers are polyacrylamide (PAM) and partially hydrolysed polyacrylamide (HPAM); PAM/HPAM materials with degree of hydrolysis ranging from 0 to 50% and molecular weight ranging from 100,000 to >10,000,000 g/mol have been employed. The mechanisms by which RPM polymer solutions and crosslinked gels achieve a disproportionate reduction in water permeability relative to oil permeability have been investigated in numerous laboratory studies. Typically, an RPM treatment based on a solution of HPAM without crosslinker and applied in a water-wet sandstone (Clashach sandstone 200-900 mD) results in a 2.4 fold decrease in water permeability (at residual oil saturation, $S_{or}$) compared to a 1.6 fold decrease in oil permeability (at irreducible water saturation, $S_{wi}$).

U.S. Pat. No. 6,228,812 describes a family of copolymers consisting of a hydrophilic monomeric unit, e.g. the ammonium or alkali metal salt of acrylamidomethylpropane sulphonic acid (AMPS) and a "first anchoring" monomeric unit (5-15 wt %) consisting of N-vinylformamide, N-methylacetamide and/or N,N-diallylacetamide; the copolymers can also include a second anchoring unit such as dimethyldiallyl ammonium chloride and/or the ammonium or alkali metal salt of acrylic acid and a "filler" unit based on acrylamide and/or methylacrylamide. The "anchoring" units are designed to promote binding to pore-lining minerals (in particular, clays and feldspars) in the formation so that the polymer is more strongly retained during production. The idea is that after the polymer solution has been injected into the formation, the treatment is shut in to allow the amide-containing units to be hydrolysed to form amine anchoring groups. The data given in the examples indicate that the copolymers induce a significant selective reduction of water permeability relative to oil permeability when applied in Berea sandstone cores of initial brine permeability 1000 mD. The factors by which the water and oil permeabilities are reduced by the treatment are strongly influenced by the backflow rate. At low backflow rates, the factor by which the water permeability is reduced can be greater than 10 times the factor by which the oil permeability is reduced. At higher backflow rates, the water permeability (at $S_{or}$) is decreased by a factor 1.9-2.5 compared to a 1.0-1.1 fold decrease in oil permeability (at $S_{wi}$); it is notable that the effect on the oil permeability is significantly lower than that reported for a typical non-crosslinked HPAM treatment.

U.S. Pat. No. 6,133,204 describes a selective treatment based on the use of a delayed polymer gel formulation which evolves to form a flow resistant crosslinked polymer gel in the watered out layer/zone but which will not form a crosslinked gel in the oil-rich layer/zone(s) due to its interaction with a gel-breaking/gel-inhibiting fluid. The latter is a one phase oil/solvent mixture in which is dissolved 2-10% carboxylic acid e.g. citric acid or lactic acid; the example given is a fluid containing 70% oil, 20.5% isopropanol and 4.5% citric acid. The gel-inhibiting fluid can be injected as a preflush, as a postflush or both; the invention relies on the preferential injection of the gel-inhibiting fluid into the oil-rich zones.

G.B. patent 2335428A describes gelling formulations formed by hydrophobically-modified polymers and their application in water control operations. This patent describes the concept of preventing crosslinking of the hydrophobically modified polymer when the fluid is in contact with hydrocarbon; thus, such selective formulations can be used to form a polymer gel in watered out layer/zone but not in the oil-rich layers/zones.

Selective fluids based on viscoelastic surfactants in combination with crosslinkable, preferably hydrophobically modified, water-soluble polymers and related delayed viscoelastic surfactant based gelling compositions are also known. The known methods include a process in which a plug of viscous fluid based on a viscoelastic surfactant is injected into the formation prior to a polymer-based fracturing treatment; during backflow, the production of formation water is selectively retarded by the viscous plug leading to a higher recovery of the fracturing fluid. The same patent also describes the use of viscoelastic surfactant based fluids to divert acidising formulations into hydrocarbon-rich zones. These and other selective processes based on viscoelastic surfactants are also described in U.S. patent application 20020023752.

U.S. Pat. No. 4,183,406 describes a selective fluid formulation based on a polymer solution consisting of a neutralized ionomeric polymer dissolved in a nonpolar organic liquid and a polar cosolvent. Upon mixing with water, the polar cosolvent in the polymer solution is taken up by the water and the polymer and nonpolar organic liquid components then form a gel; a typical formulation contains diesel oil, sulphonated ethylene-propylenediene terpolymer and methanol. A similar approach has also been proposed for use in non-aqueous fracturing fluids.

U.S. Pat. No. 5,735,349 describes a selective fluid formulation based on a dispersion of water swellable crosslinked polymer particles (0.05-1 micron in diameter) made by invert polymer emulsion or microemulsion processes. After the dispersion has been injected into the formation, contact by water during backflow causes the particles to swell many times their initial size thereby blocking flow; in contrast, it is claimed that the particles remain shrunken and non-blocking in the oil-rich zones.

U.S. Pat. No. 4,191,249 describes an oil-based selective fluid formulation which contains an oil-soluble thickening agent (e.g. polymethyl laurylate, polyalkyl styrene, polybutadiene, polyisobutylene or a di/trivalent metallic soap of a monocarboxylic acid with 14 or more carbon atoms) and a solid particulate water-soluble thickening agent (e.g. HPAM, cellulose derivative or natural gum). After injection, mixing with water during backflow causes the water-soluble thickening agent to inhibit flow whilst it is claimed that the treatment fluid is more easily removed from the oil-rich zones. Other oil-based selective fluid systems have been reported including the crude oil/emulsifier system described, forming a flow-resistant or blocking emulsion in the watered out layer/zone compared to a negligible permeability reduction in the oil-rich zones.

The application of oil-soluble, water-insoluble particles has been proposed for improving fluid loss control in drilling, completion, workover, fracturing and acidising fluids. For example, Fischer et al. in U.S. Pat. No. 3,979,304 And U.S. Pat. No. 3,979,305 proposed the use of a particulate homogeneous solid solution of (1) wax, (2) oil-soluble polyhydroxy higher fatty acid partial ester surfactant and (3) water-dispersible surfactant (e.g. polyethoxyethylene alkyl phenol, polyethylene glycol higher fatty acid ester, polyethoxyethylene tertiary fatty amine or polyethoxyethylene fatty amide condensate). The same investigators extended their proposal to include slowly oil-soluble water-insoluble particles in U.S. Pat. No. 3,989,632.

U.S. Pat. No. 4,525,285 describes an oil-based drilling fluid comprising oil, water, weighting agent, emulsifying agent and a powdered "seepage loss reducer". The latter component is an amorphous silicate (with molar ratio $SiO_2/M_2O$ in the range 1.5-3.3 where M is sodium and/or potassium) and/or an ammonium soap of a fatty acid having about 12 to about 22 carbon atoms (the examples mention the use of ammonium oleate and ammonium laurate; the preferred fatty acids are oleic acid, ricinoleic acid and palmitoleic acid). The idea is that the "seepage loss reducer" will react with polyvalent cations (e.g. calcium) in the formation to form a precipitate seal adjacent to the wellbore.

U.S. Pat. No. 4,352,396 describes a selective treatment fluid based on a resin emulsion which, after placement, demulsifies to form coalescent oil-soluble water-insoluble resin droplets. The resin emulsion comprises an aqueous continuous phase, a resinous disperse phase and emulsifier(s); also included is an ester compound which after placement degrades to induce/promote demulsification. The oil-soluble water-insoluble resin droplets coalesce to form liquid droplets which can resist flow in the watered out layer/zone(s). In this scenario, the resin has a softening temperature which is lower than the temperature of the formation. A typical example comprises a 50% emulsion of petroleum aliphatic particles stabilized with a soap of wood rosin as the emulsifier. The preferred ester is ethyl monochloroacetate; the acid formed by degrading the ester must have a sufficient strength to initiate demulsification. When the emulsion is injected into oil-rich zones, there is no associated plugging as the resin droplets are readily soluble in the oil phase.

U.S. Pat. No. 6,419,017 describes a method of preventing gas breakthrough in an oil well which involves injecting the following sequence of aqueous solutions: (i) a solution of alkaline earth salt (e.g. calcium chloride or magnesium chloride), (ii) a spacer solution of alkali metal salt (e.g. 2 wt % KCl) and (iii) an aqueous dispersion of oil soluble fatty acid(s), $CH_3(CH_2)_n COOH$ where n is typically between 12 and 24 and, preferably, the fatty acid(s) is unsaturated. The patent mentions the following fatty acids: palmitic, stearic, oleic, linoleic, linolenic, eleostearic, licanic, ricinoleic, palmitoleic, petroselenic, vaccenic and erucic. The third pumped aqueous dispersion of oil-soluble fatty acid(s) may also contain isopropyl alcohol, ammonium hydroxide and so-called tall oils or rosin. On backflow, the divalent cations, $Ca^{++}$ and/or $Mg^{++}$ in the first pumped solution react with the carboxylate groups in the third pumped dispersion to precipitate a material which is oil-soluble. This fatty acid resin precipitate is insoluble in water or gas but it gradually dissolves in oil to allow oil to be produced from the oil-rich zones.

The use of oil-soluble tracer solutions based on a non-polar solvent in which is dissolved the gadolinium salt of an α-branched carboxylic acid has been described in U.S. Pat. No. 6,001,280 and the International patent application WO 02/11873/A1. Such tracer solutions are used in methods to measure the flow velocity of a hydrocarbon phase in a multiphase flow. α-branched carboxylic acids which are soluble in both organic and aqueous fluids have also found oilfield application in viscoelastic surfactant gels.

GB 2348447 and EP 1041242 describe oil-soluble crystalline additives for water-based well-bore fluids. Examples of the additives used are camphor, lanolin and IS-endo-Borneol. The additive forms a "filtercake" at the boundary between the well-bore and the formation. When hydrocarbons flow back from the formation, the filtercake is partially dissolved.

A number of methods to reduce water production are based on precipitates generated in the formation from aqueous and non-aqueous treatment fluids. Among those the most relevant to the invention are the following.

U.S. Pat. No. 5,346,013 describes a method for reducing the influxes of water of a deposit using a non-aqueous solution of a hydrophobe water-insoluble polymer which precipitates in the presence of the connate water of the deposit.

U.S. Pat. No. 3,866,685 describes methods and compositions for selectively blocking the water rich strata of subterranean formations including the injection into the formation of a water-soluble, oil-insoluble soap or ester. The water-soluble and oil-insoluble soaps include water-soluble derivatives of abietic acid.

U.S. Pat. No. 3,859,107 describes a composition for stimulating production including an aqueous solution of a polar solvent having dissolved in the solution rosin soap and fatty acid soap. The composition reacts with the connate brine to produce a precipitate that blocks the brine bearing passages.

U.S. Pat. No. 3,695,356 describes a composition for plugging off sources of water by injecting solutions of chemicals which preciptate at a controlled rate, for example aqueous solutions of isocyanuric salts which hydrolyze.

Another method of sealing porous formation is described in the U.S. Pat. No. 2,858,892. The method includes the use of water-soluble salts of water-insoluble acids sauch as rosin soaps and abietic acid with delayed precipitation.

Another method for shutting off water entering wells is described to in the U.S. Pat. No. 2,842,206. The patent teaches dissolving oil soluble, water insoluble material at 40% to 60% by weight in alcohol and injecting the solution into the water producing formation. The material is a rosin polymer in a water miscible solvent. The solvent is specifically characterized as being miscible in all proportions with water to remove any limitation on the degree of precipitation of the rosin polymer. The required high content of treatment material makes this method economically unattractive.

SUMMARY OF THE INVENTION

The present invention is at least partly based on the realisation that certain compounds can exhibit markedly different solubilities in hydrocarbons and aqueous media, and that these properties make them suitable for use in water-control applications and selective fluid treatments.

The present invention provides a well bore treatment fluid for selectively reducing the outflow of water during hydrocarbon recovery from a water-producing hydrocarbon reservoir in a formation, the fluid containing 5 to 40 weight per cent of a water-immiscible dissolved compound based on α-branched carboxylic acid, derivatives or co-polymers thereof, and capable of forming a precipitate that is substantially soluble in hydrocarbons and substantially insoluble in water.

The precipitate forms more readily in aqueous media than in hydrocarbon media and/or, once formed, dissolves more readily in hydrocarbons than in aqueous media. The precipitate is typically a waxy or crystalline solid and is more soluble in hydrocarbons than in water. The chemistry of the waxy or crystalline solid is selected for high solubility in oil and low solubility in water and brine.

Generally, the precipitate has at least 5.0 wt % solubility in hydrocarbons, preferably at least 10.0 wt % or at least 20.0%. In particularly preferred embodiments, the precipitate has at least 50.0 wt % solubility in hydrocarbons. Generally, the precipitate has less than 1.0 wt % solubility in water, preferably less than 0.10 wt %.

In the present invention, unless stated otherwise, oil and water solubilities can be measured as follows: Hydrocarbon (oil) solubility may be measured as solubility in (i) model oils such as mineral spirits (a mixture of branched alkanes $C_9$ to $C_{11}$, bp 179-210° C., available from Sigma-Aldrich Corp.), FINALAN™ 75 (a mixture of linear and branched hydrocarbons $C_{10}$-$C_{14}$ plus a significant cyclic hydrocarbon content) or HALPASOL™ 190/240 (a mixture of n-alkanes $C_{10}$, $C_{12}$ and $C_{14}$ and a minor concentration of branched hydrocarbons) or (ii) crude oil (i.e. which is typically from the formation in which the treatment fluid is to be injected).

Solubility in water and aqueous media may be measured as solubility in typical model brines or formation brines (for example, the data in Table 1 employs a model brine which is 1M NaCl).

Solubility can be assessed by:
(i) preparing a mixture containing a given concentration of the compound in brine or oil,
(ii) heating and equilibrating at elevated temperature e.g. 60° C.,
(iii) cooling to 25° C., and
(iv) visually inspecting any residual material; if insoluble residue is observed it can be filtered out and its weight determined to establish how much compound dissolved.

The treatment fluid is designed to allow the flow of oil but to restrict the flow of water due to the selective precipitation of a flow-resistant solid phase in the presence of a high water saturation. On contact with water, brine or precipitating cations in the formation, the treatment fluid forms a precipitate which remains insoluble unless it subsequently interacts with hydrocarbon. In contrast, on contact with hydrocarbon the treatment fluid does not form a precipitate. Zones where there is flow of water from the formation into the well bore are selectively blocked by the precipitate, while zones where there is flow of hydrocarbons from the formation into the well bore are not blocked by the precipitate, or at least are blocked to a lesser extent.

Treatment fluids according to the invention are suitable for injection into multi-layered reservoirs. Multi-layered reservoirs may contain a number of oil-producing layers and one or more layers producing fluid with a high water/oil ratio at an excessive rate (watered-out layers), through which the bore is driven. The present invention ameliorates water-production problems in such reservoirs. During backflow, the rise in water saturation causes the dissolved compound to precipitate in the watered-out layer(s), blocking water flow. Precipitation in the oil layer is inhibited by the high oil saturation.

However, if precipitation does occur in the oil layer, the precipitate can re-dissolve because it is oil-soluble, and so the oil-rich zones are unblocked.

Treatment fluids according to the invention are also suitable for controlling excessive water outflow due to water coning. Treatment fluid is pumped into zones above or near to the oil-water contact. When water coning occurs, water saturation rises and the dissolved compound forms a precipitate, thus reducing the vertical permeability to water. This prevents or at least delays water ingress to the bore.

Treatment fluids according to the invention are also suitable for setting up a diversion of subsequently pumped hydrophilic or aqueous fluids e.g. acidising fluids. Such a method employing a viscous fluid containing a viscoelastic surfactant capable of forming a worm-like micelle in an aqueous environment is described in U.S. Pat. No. 5,979,557. In place of the viscous fluid, treatment fluids according to the present invention would induce a precipitation in the water-rich layer(s)/zone(s) but precipitation would not occur in the oil-rich layer(s)/zone(s).

The materials of the present invention are desirably selected so that the precipitate has a high melting point. This advantageously broadens their potential application to hydrocarbon reservoirs with a wide range of temperature conditions. The melting point of the precipitate is normally over 50° C. Preferably it is over 100° C., over 130° C. or, more preferably, over 150° C.

Treatment Fluids

The treatment fluid may be based on an organic solvent, or pure oil-based or substantially oil-based. It may also be a mixture of oil and solvent or a mixture of water and solvent. The water may contain dissolved salt, and may be brine. Thus, the treatment fluid may be a mixture of brine and solvent.

In the case of a brine/solvent mixture, depending on the solvent chemistry, on the precipitate (e.g. waxy solid) chemistry and on the concentration of precipitate (e.g. waxy solid) predissolved, the typical volume ratio brine:solvent ranges from 0:1 to 3:2.

Preferably the treatment fluid is based on oil, mutual solvent or a mixture of oil and mutual solvent or a mixture of water and mutual solvent. The solvent can be in all proportions miscible with water, however it was found that for many applications it is actually more beneficial to use a solvent that is not fully miscible in water. The treatment fluids tend to resist unwanted precipitation of the dissolved compound in hydrocarbon-producing zones, as the produced hydrocarbon merely dilutes the compound in the treatment fluid. In contrast, fully miscible solvents are suspected to lead to precipitation induced by so-called irreducible water content in the oil, leading to the blocking of oil-bearing formations, specifically those with low permeability.

Typical examples of preferred mutual solvents are dipropylene glycol methyl ether (DOWANOL™ DPM), ethylene glycol butyl ether (2-butoxyethanol; DOWANOL™ EB), and propylene glycol butyl ether (2-butoxy-propan-1-ol; DOWANOL™ PnB). Thus, for example, a mutual solvent may have a molecular weight of less than 300 g/mol, preferably less than 200 g/mol. Typically it has a molecular weight of greater than 50 g/mol.

Preferably, the treatment fluid is a low viscosity solution, to facilitate injection into the formation. Typically, the viscosity of the treatment fluid is less than 100 cP as it enters the formation. Preferably, it not more than 50 cP.

Variable amounts of the dissolved compound may be present in the treatment fluid, e.g. about 5 wt %, about 10 wt %, about 20 wt % or about 50 wt % and the different proportions of dissolved compound to solvent confer different properties on the treatment fluid, in particular the tendency of the compound to precipitate when the treatment fluid is diluted with water or brine. The treatment fluids can thus be designed with a low or high tolerance to brine dilution depending on the characteristics of the subterranean formation.

The preferred concentration of the dissolved compound will vary according to the characteristics of the subterranean formation. The water-blocking efficiency of the precipitate will depend on its chemistry and morphology, its concentration when precipitated and the permeability and pore structure of the rock in which it is formed. Typically, the concentration of the dissolved compound is within a range having a lower limit of 5 wt %, 10 wt % or 20 wt % and a upper limit of 20 wt %, 30 wt %, 39 wt %, 40 wt % or 50 wt %. The most preferred range is 10 to 20 wt %.

In some embodiments, the precipitate is a divalent or trivalent metal salt of an α-branched carboxylic acid. This chemistry provides more desirable solubility properties over materials used in the prior art. In particular, it considerably enhances solubility in oil and mutual solvents.

The water insoluble precipitates formed by these compounds are typically waxy solids. Preferred metal salts are the salts of $Ca^{2+}$, $Mg^{2+}$, $Zn^{2+}$ and $Al^{3+}$.

An "α-branched" carboxylic acid is a branched-chain carboxylic acid having a branch on the carbon atom (the α-carbon) adjacent to the carboxyl group.

Aliphatic α-Branched Carboxylic Acids

In preferred embodiments the precipitate has the structure:

wherein:

$R_1$ is a $C_{30}$-$C_5$ (preferably $C_{20}$-$C_5$ or $C_{15}$-$C_5$) aliphatic (preferably hydrocarbyl) group having a $C_{20}$-$C_4$ (preferably $C_9$-$C_4$) linear chain bonded at a terminal carbon atom thereof (the a carbon atom) to the carbon atom of the carboxyl (COO) group, and further having at least one $C_1$, $C_2$ or $C_3$ side group bonded to said terminal carbon atom, and M is a divalent or trivalent metal cation (typically calcium, magnesium, zinc or aluminium).

Thus, in some embodiments, M is divalent and n=2. In other embodiments M is trivalent and n=3.

The term "aliphatic", as used herein, pertains to compounds and/or groups which are linear or branched, but not cyclic. An aliphatic group may comprise a hydrocarbyl group having a non-hydrocarbyl moiety (e.g. a halogen group or an amine group) attached thereto. An aliphatic group may be a hydrocarbyl group.

Preferably, the $R_1$ group has two $C_1$, $C_2$ or $C_3$ side groups bonded to the α-carbon atom. Thus, the precipitate can be a neo-carboxylate.

The linear chain may be saturated or partially unsaturated.

Suitable metal carboxylate salts, $(R_1COO^-)_n M^{n+}$, are those derived from commercially available synthetic α-branched saturated carboxylic acids, for example:

1. Neodecanoic acid (neo-$C_9H_{19}COOH$).

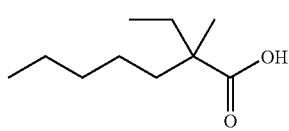

This material is available from Resolution Performance Products who market the product under the tradename "VERSATIC™ 10" and from Exxon who market the product under the tradename Neodecanoic acid. At ambient temperature, neodecanoic acid (CAS reg. No. 26896-20-8) is a clear liquid; its density is 0.91 kg/L at 20° C. and its melting point is below −30° C. Calcium neodecanoate is commercially available from Strem Chemicals.

2. Neotridecanoic acid, (neo-$C_{12}H_{25}$COOH). The probable structure of this compound is:

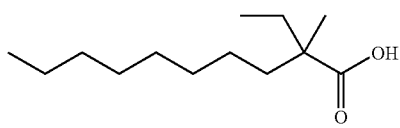

This material is supplied by Exxon.

3. VERSATIC™ 10/18, a mixture of neo-$C_9H_{19}$COOH (VERSATIC™ 10) and neo-$C_{17}H_{35}$COOH (VERSATIC™ 18), supplied by Resolution Performance Products.

The probable structure of VERSATIC ™ 18 is:

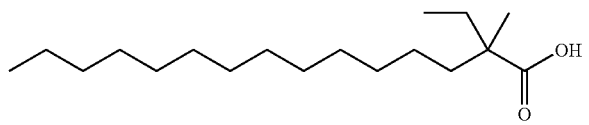

Cyclic α-Branched Carboxylic Acids

In further preferred embodiments the precipitate has the structure:

$(R_2COO^-)_n M^{n+}$ wherein:
- $R_2$ is a $C_{10}$-$C_{30}$ cyclyl (preferably hydrocarbyl) group bonded at a carbon atom thereof (the a carbon atom) to the carbon atom of the carboxyl (COO) group, and having at least one $C_1$, $C_2$ or $C_3$ side group bonded to the a carbon atom, and
- M is a divalent or trivalent metal atom (typically calcium, magnesium, zinc or aluminium).

The term "cyclyl", as used herein, pertains to a monovalent moiety obtained by removing a hydrogen atom from a ring atom of a compound which has at least one ring.

In some embodiments, M is divalent and n=2. In other embodiments M is trivalent and n=3.

The precipitate may have a polymerised form of the above structure.

Such structures can also provide strong contrasts between hydrocarbon and aqueous media solubilities.

The cyclyl group can be mono- or poly-cyclic.

Advantageously, precipitates with cyclic hydrocarbon groups as above may be gummier than alphatic precipitates, and are therefore particularly useful in blocking formation water by forming a waxy, gummy "plug". Such precipitates may become stuck to the formation rock and thereby seal off water-producing zones.

Examples of precipitates that form gummy plugs include precipitates of abietic acid, compositions derived from or (co-)polymerised with abietic acids or precursors of abietic acids and such derivatives and (co-)polymers and of polymerised abietic acid, and precipitates of their divalent and trivalent metal salts. Co-polymers of the abietic acids include phenolic-modified resin derivatives as described for example below. The term "abietic acid" is understood to includes chemically similar compounds, some of which are also described below.

The compound dissolved in the treatment fluid may be abietic acid itself or an abietate salt. It may be polymerised abietic acid or polymerised abietate. The compound may be dissolved as a divalent or trivalent metal salt.

Abietic acid is a naturally occurring partially unsaturated α-branched carboxylic acid (melting point 139-142° C.; water, oil and solvent solubilities shown in Table 1):

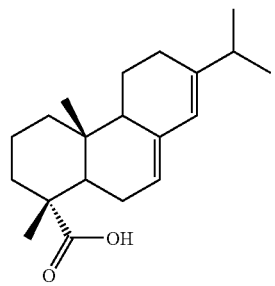

Abietic acid is one of a number of acids derived from tree resins. The structure of some other abietic acid type resin acids are shown below:

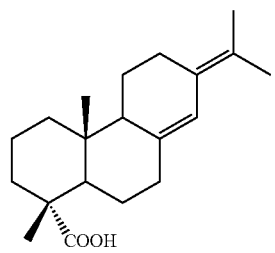
Neo-abietic acid

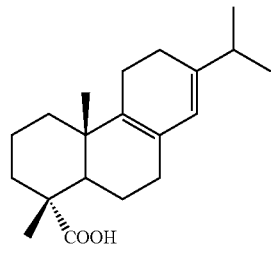
Palustric acid

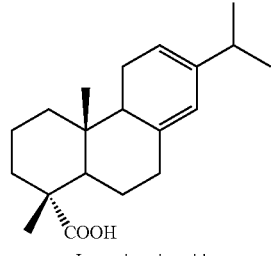
Levopimaric acid

-continued

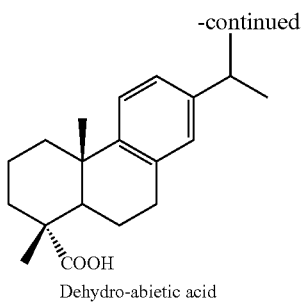
Dehydro-abietic acid

It should be appreciated that when we refer to abietic acid, we include mixtures of abietic acid with other abietic acid type resin acids such as those shown above.

Calcium abietate, $(C_{19}H_{29}COO)_2Ca$, is commercially available, for example, as the product "DERTOCAL™" supplied by Les Dérivés Résiniques & Terpéniques S.A. or the product calcium resinate supplied by Barium & Chemicals, Inc. Calcium abietate is illustrated below:

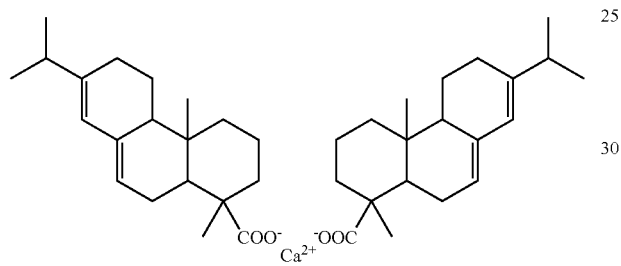

Polymerised abietic acid may be used. This material is commercially available as the calcium/zinc salt, $(C_{38}H_{58}(COO)_2)_n(Ca,Zn)_n$, for example, as the product "MERIGRAL™" supplied by Les Dérivés Résiniques & Terpéniques S.A.

Possible structures of polymerised abietic acid are:

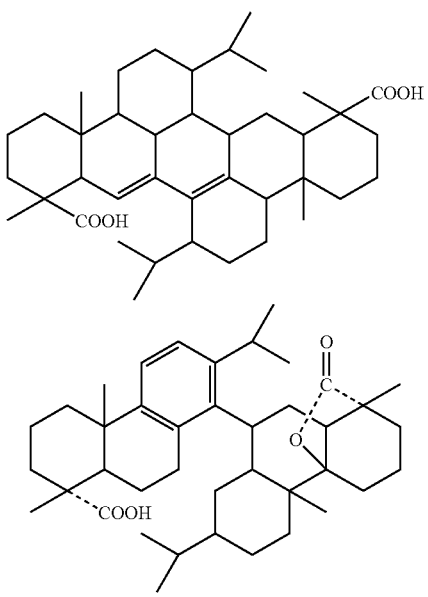

-continued

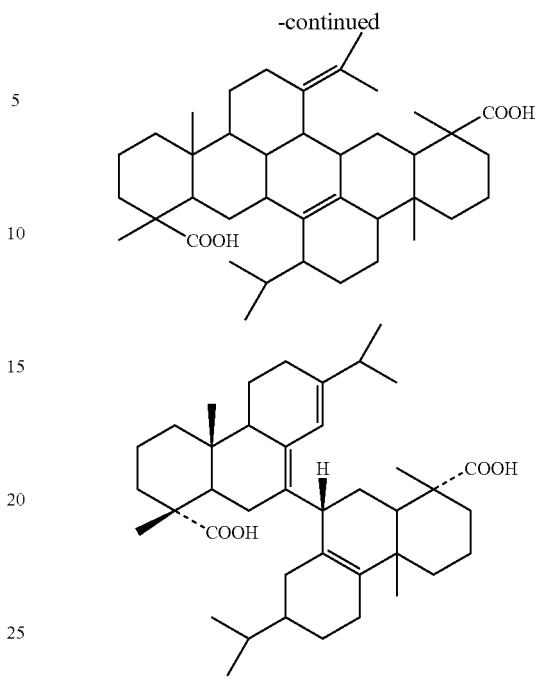

Thus $R_2COO$ may be, or may comprise, an abietate group.

The precipitate may be a divalent or trivalent metal salt of abietic acid or polymerised abietic acid. Preferred divalent metals are $Ca^{2+}$, $Mg^{2+}$ and $Zn^{2+}$. A preferred trivalent metal salt is $Al^{3+}$.

It was observed that both calcium abietate and abietic acid have high melting points. Therefore, the material predissolved in the treatment fluid can be abietic acid or polymerised abietic acid or it can be a divalent or trivalent metal salt of abietic acid or polymerised abietic acid. All these materials will form a precipitate with high melting point when the treatment fluid mixes and interacts with formation brine in the reservoir; in contrast, a precipitate will not form when the same treatment fluids mix and interact with oil. It is noted that when such a precipitate is formed from a divalent or trivalent metal salt of abietic acid or polymerised abietic acid, it may subsequently mix and interact with an acidic aqueous phase; during this interaction, any conversion to abietic acid or polymerised abietic acid will not convert the precipitate to a liquid phase as both abietic acid and polymerised abietic acid are waxy solids with high melting points.

After injection of such an alkaline aqueous treatment fluid containing dissolved abietate or polymerised abietate into the formation, two scenarios can occur:

(i) During backflow, as the formation brine mixes with the treatment fluid, the pH can decrease to a value which converts the abietate anion to abietic acid (solid). This abietic acid precipitate is oil-soluble and water-insoluble. Thus, the water flow will be reduced in the water-rich zone(s), while in the oil-rich zone(s) any precipitated solids will be dissolved and removed by the oil flow.

(ii) During backflow, the cations such as $Mg^{2+}$ and $Ca^{2+}$ present in the formation brine will associate with abietate to form oil-soluble water-insoluble calcium abietate or magnesium abietate. Thus, the water-flow will be reduced in the water-rich zone(s), while in the oil-rich zone(s) the solid will be dissolved and removed by the oil-flow.

Dissolved Compounds and Precursors

The dissolved compound in the well bore treatment fluid of the invention may be the same compound that constitutes the precipitate. Thus, it may be a dissolved waxy or crystalline solid. In other embodiments, the dissolved compound is a water-soluble compound capable of forming the precipitate of the invention.

Where, the precipitate is a divalent or trivalent metal salt of the α-branched carboxylic acid (aliphatic or cyclic), the dissolved compound may be a carboxylate anion of the precipitate. Monovalent metal salts of some α-branched carboxylates are water-soluble, even where the divalent and trivalent metal salt of the same carboxylate is insoluble or poorly soluble in water. The dissolved compound may be a water-soluble salt of an α-branched carboxylic acid, wherein the divalent or trivalent metal salt of said carboxylic acid is the precipitate according to the invention. Thus, the compound may be dissolved as a monovalent metal salt such as a sodium or potassium salt, preferably a sodium salt. For example, Na versatate 10 is soluble in water to at least 1 mol/l.

Precipitation of the carboxylate anion from alkaline aqueous solution may be induced by a decrease in pH or by interaction with divalent cations, e.g. $Ca^{2+}$ and $Mg^{2+}$. Accordingly, in some embodiments treatment fluid of the invention may contain a dissolved compound capable of forming a carboxylate precipitate as described herein. The dissolved compound may be a precursor of the compound that precipitates, i.e. a compound that is degradable to form the precipitate.

Treatment fluids according to the invention may be designed to minimise premature precipitation, i.e. precipitation occurring prior to a backflow phase after the fluid has been placed into the reservoir. Premature precipitation occurring before or during injection may inhibit injection. Accordingly, the invention provides a treatment fluid containing a dissolved compound capable of forming a precipitate as described above, wherein the dissolved compound is a precursor of the precipitate. Use of a precursor can prevent or reduce premature precipitation.

The precursors are insoluble in water. For example, solvent-soluble precursors can be used, whereby the treatment fluid can be based on a mutual solvent or a mixture of solvent and oil.

The minimum workable solubility of the precursor in the solvent-based or solvent/oil-based treatment fluid is that which can form an effective precipitate, effective in the sense that it reduces water permeability. The precursor is typically present in the treatment fluid at greater than 5 wt %. It is typically present at less than 50 wt % and more preferably less than 40% or even more preferably less than 30%.

Normally, a precursor molecule is designed with a hydrophobic group (Hyd) linked through a cleavable bond or group (Cle) to a water-soluble group (Wat), i.e. Hyd-Cle-Wat.

The precursors degrade after injection into the formation, as the cleavable group is hydrolysed to release the hydrophobic group, typically a carboxylate anion. The free hydrophobic groups form a precipitate according to the invention.

An example of a water-soluble group structure is:

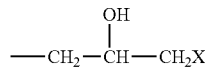

wherein X is OH, $SO_3Na$ or $OSO_3H$.

The cleavable group is preferably an amide, —CONH—, or ester, —COO—, linkage.

For example, the hydrophobic group, $R_1$— or $R_2$—, can be linked through an ester linkage to a water soluble group. On degradation in the formation, the ester linkage is hydrolysed to release $R_1COO^-$ or $R_2COO^-$, an α-carboxylate which forms a divalent or trivalent metal salt precipitate.

Precursors are particularly suitable for use where the precipitate is a divalent or trivalent metal salt of an α-branched carboxylic acid. Thus, the dissolved compound may be a precursor of a metal salt of an α-branched carboxylic acid, the precursor being degradable to form the α-branched carboxylate anion of the metal salt in situ in the underground formation.

α-branched carboxylates released from the precursor combine with divalent or trivalent metal cations such as $Mg^{2+}$, $Ca^{2+}$, $Zn^{2+}$ and $Al^{3+}$ to form a precipitate according to the invention. The precipitating cations may be present in formation water or may be supplied in the treatment fluid or by additional injections.

Once the treatment fluid is placed in the formation, precipitation may occur (see scenarios below). Note that the relatively high temperature of the formation increases the rate of hydrolysis and thus the rate of production of anions that can combine with divalent or trivalent metal cations to form a precipitate.

Precipitation Scenarios

The present invention can provide a series of treatment fluids that can be used to selectively reduce the rate of water production during the production of hydrocarbons from subterranean reservoirs. Each fluid can deliver delayed precipitation of a precipitate according to the invention.

There are a number of scenarios by which the precipitate can be delivered to the reservoir. Examples with abietic acid and polymerised abietic acid have been described above. Two further scenarios are outlined below. For purposes of illustration only, and not by way of limitation, in each example the precipitate is a divalent metal salt of a carboxylic acid having the structure $(RCOO)_2M$ (R can be e.g. $R_1$ or $R_2$ as defined above). It should be understood that the scenarios may apply to other compounds of the invention.

1. In a first scenario, the treatment fluid is a solution in which the divalent metal salt of a suitable α-branched carboxylic acid, $(RCOO)_2M$, has been pre-dissolved in a suitable solvent (e.g. a mutual solvent, a mixture of mutual solvent and brine, a mixture of oil and mutual solvent, or a suitable oil). A "spacer" solution, typically consisting of the equivalent solvent without added carboxylate salt may be injected ahead of the treatment fluid. A function of the spacer is to inhibit precipitation during injection of the treatment fluid. During the backflow phase, formation brine then mixes and/or interacts with the treatment fluid to an extent that, at a critical water/brine saturation, the divalent metal salt $(RCOO)_2M$ precipitates. This critical water/brine saturation is attained in the watered-out zone(s), whereas precipitation is inhibited by the high oil saturation prevailing in the oil zone(s).

2. In a second scenario, the treatment fluid is a carboxylic acid precursor compound pre-dissolved in a suitable solvent such as those described for the first scenario (e.g. a mutual solvent, a mixture of mutual solvent and brine, a mixture of oil and mutual solvent, or a suitable oil). In this approach, precipitation requires the precursor compound to degrade, the carboxylate anion to combine with divalent cations in the back-flowing formation brine and the water/brine saturation to increase to a critical level.

In the two scenarios, the treatment fluid is preferably a low viscosity solution which is easily pumpable and injectable into typical reservoir rocks. Whilst second scenario relies on an interaction with divalent cations in the back-flowing formation brine, the first scenario relies on a critical water/brine saturation to trigger precipitation of the oil-soluble water-insoluble solids.

Divalent and trivalent metal salt $(RCOO^-)_n M^{n+}$ precipitates can be used in the present invention, as discussed above. Other chemistries are also suitable for use in the present invention, including chemistries allowing for (i) the placement of a solvent-based treatment fluid, (ii) subsequent precipitation by mixing/interaction with high water saturations during backflow in the watered-out layer(s)/zone(s) and (iii) inhibited precipitation by mixing with high oil saturations during backflow in the oil-rich layer(s)/zone(s).

Other Precipitate Chemistries Based on Reaction Products of Abietic Acids or Copolymers Thereof Accordingly, in a further embodiment of the invention, the compound pre-dissolved in the treatment fluid can be a resin or resin derivative which is not a divalent nor a trivalent metal salt $(R_1 COO^-)_n M^{n+}$ but which is sufficiently soluble in the backflowing oil and sufficiently insoluble in the backflowing water to meet the requirements of the invention described herein. Such materials should also have high melting points to ensure the precipitate is stable in a wide range of reservoir temperatures.

Examples of such resins or resin derivatives are abietic acid and polymerised abietic acid (described above).

Other examples of precipitates are the phenolic-modified resin derivatives (melting point 170-180° C.). Phenolic-modified resins can have widely varying compositions according to their method of manufacture and in particular as a function of the following variables in the manufacturing process:

1. phenol type used
2. mole ratio of phenol to formaldehyde
3. ratio of phenol/formaldehyde condensate to resin
4. dibasic acid modification
5. esterification degree and type of polyhydric alcohol.

A wide range of physical properties may be obtained by using various combinations of the variables listed above.

The most common phenols used are, p-tert-butylphenol (1), diphenylol propane (Bisphenol A) (2) and alkyl phenol (3); their structures are shown below:

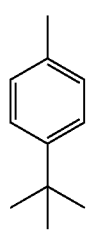

1

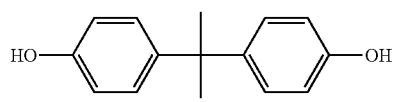

2

-continued

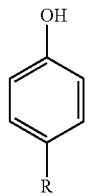

3

For structure 3 above, R is typically a $C_8H_{17}$ or $C_9H_{19}$ group.

Other phenols such as m-Cresol (4), o-Cresol (5), p-Cresol (6) can be used.

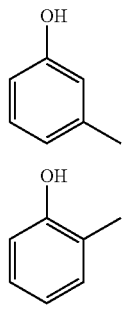

4

5

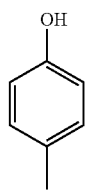

6

The ratio of phenol to formaldehyde controls the degree of crosslinking of the phenol-formaldehyde resin. With low formaldehyde/phenol ratios, short-chain polymers are formed; these phenol-formaldehyde resins will be lower in viscosity and melting point than those using higher formaldehyde/phenol ratios.

Under acid conditions, one mole of formaldehyde reacts with two moles of phenol to form a methylene bridge; the products are known as "Novolac" phenol-formaldehyde resins:

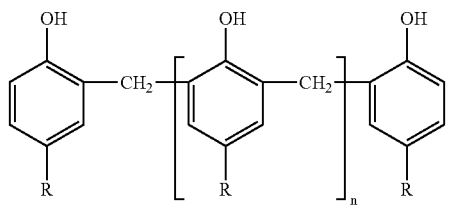

where n is typically 2 to 8 and R can vary according to the type of phenol used (e.g. refer to phenol types 1 to 6 shown above).

Under alkaline conditions, one mole of formaldehyde reacts with one mole of phenol to form methanolated phenol which during subsequent condensation forms a methyl ether bridge; these products are known as "Resole" phenol-formaldehyde resins:

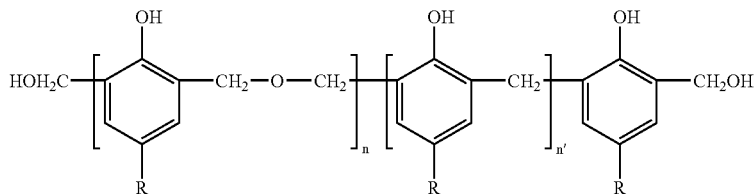

where n and n' are integers with (n+n') typically being between 2 and 6 and R can vary according to the type of phenol used (e.g. refer to phenol types 1 to 6 shown above).

The preparation of a typical abietic acid based co-polymer or phenolic-modified resin of the invention involves the following ingredients:
- Resin (containing abietic acid and abietic-type structures) (65 wt %)
- Substituted Phenol-formaldehyde resin (21 wt %)
- Catalyst (MgO) (0.5 wt %)
- Dibasic Acid (Maleic anhydride) (2.0 wt %)
- Polyhydric Alcohol (Typically Glycerine and/or Penta-erythritol)

and the following process as described for example in "NAVAL STORES, Production, Chemistry, Utilization"—Zinkel and Russel—Pulp Chemical Association, Inc. ISBN 0-9600416-2-5, 688-694: (1) melt resin and add phenolic derivative at 165° C., (2) cool to 110° C. and add paraformaldehyde followed by catalyst, (3) heat under pressure to 135° C. and 30 psi—hold for pressure drop, (4) release pressure and rapidly heat to 185° C., (5) add dibasic acid and heat to 205° C. and hold 30 minutes, (6) charge polyhydric alcohol and heat to 265-270° C. for final resin properties. The reactions which occur during this process are exemplified in FIG. 1 (structures I, J, K and L).

To synthesise I, two molecules of abietic acid (G) react with a phenolic resin (resole H). To synthesise J, two molecules of abietic acid (G) react with a phenolic resin (resole H'). K is produced by reacting I' with maleic anhydride, I' being obtained by reacting abietic acid (G) and levopimaric acid (G', isomer of G) with a phenolic resin (resole H).

Phenolic-modified resins generally contain from 5 to 20% phenolic condensate, based on resin weight. The molecular complexity of a phenolic-modified resin is such that thousands of isomers can exist, which explains the generally amorphous character of these materials. Also the possibility exists of preparing a wide variety of products to meet different performance requirements.

L is produced by reacting K with an alcohol R'—OH where R' is typically $(OHCH_2)_3C$—, $OH—CH_2—CH(OH)—CH_2$— or another polyol. Derivatives of non-phenolic resins can also be employed in the invention such as N, P and Q (see FIG. 1). N and P are obtained as follows: G' (which is an isomer of G, see FIG. 1) reacts with maleic anhydride to give M. M can then react with an alcohol R'—OH. When R' is $(OHCH_2)_3C—CH_2$—, the product of the synthesis is N. When R' is $OH—CH_2—CH(OH)—CH_2$—, the product of the synthesis is P. Q is obtained by reacting G" (polymerized abietic acid) with two molecules of penta-erythritol. The chemistry and synthesis of such resins and derivatives is described in detail in Zinkel and Russel. The water, solvent and oil solubilities of example phenolic-modified resin products (again available from Les Dérivés résiniques & Terpéniques S.A. (DRT), 30 rue Gambetta—BP 206-40206 DAX Cedex (France)) are shown in Table 1; the commercial names of these products are RESENOL™ and GRANOLITE™, (their likely structure is given by L in FIG. 1).

Another possible class of composition for the purpose of this invention are naturally occurring waxes with a relatively high melting point.

In a first example of this group of compositions, the precipitate is camphor (flash point 64° C., melting point 179-181° C.):

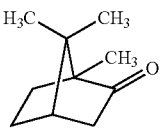

In other embodiments, the precipitate has the structure:

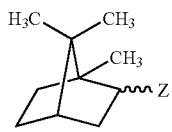

wherein Z is a hydroxyl or amine group. The Z group can be attached in either configuration.

Other structures are
(i) 1S-endo-borneol (flash point 65° C., melting point 206-208° C.)

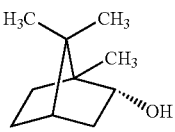

(ii) iso-borneol (melting point 212-214° C.)

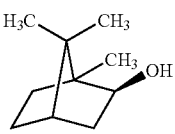

(iii) (R)-(+)-bornylamine (melting point 160-163° C.)

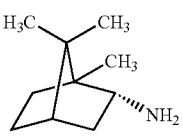

Camphor and the camphor-related compounds above can be dissolved in treatment fluids based on oil or mutual solvents, and such treatment fluids form a precipitate on interaction with water. Thus, treatment fluids are provided according to the invention, wherein the dissolved compound is camphor or a camphor-related compound having a structure as shown above.

Methods

In a second aspect, the present invention provides a method of reducing the outflow of water during recovery of hydrocarbons from a hydrocarbon reservoir in a formation, comprising:

injecting a well bore treatment fluid according to the previous aspect of the invention into the formation, whereby the precipitate selectively forms in water-producing zones of the formation to reduce the outflow of water therefrom.

As explained above, the treatment fluids can advantageously be used to control excess-water production in multi-layered reservoirs and/or from water coning.

After injection of the treatment fluid, the precipitate may be allowed to form in water-producing zones, relying on water and/or ions in the formation to cause precipitate formation.

As explained above, a spacer fluid may be injected into the formation ahead of-the treatment fluid, the spacer fluid inhibiting premature precipitation from the treatment fluid. Typically, the spacer fluid has the same base fluid as the treatment fluid, but without the dissolved precipitate-forming compound.

The method results in selective blocking and reduction of water production during hydrocarbon recovery. In some formations excess water may still be co-produced after the treatment, albeit at a reduced level. This may occur if oil is mixed with water in the water zones; the water zone will have a residual oil saturation and it may also producing some fractional flow of oil along with its excessive water production. The efficiency of blocking can then be reduced because the residual or flowing oil reduces or delays precipitate formation in the water zones or may at least partially dissolve a precipitate that has formed. This can be taken into account during the treatment design; the dissolved concentration of the active precipitant in the treatment fluid can be increased to a level such that its precipitate can tolerate the presence of a considerable residual oil saturation in the water zone and its water permeability reducing effect can persist for a useful time period even when there is a significant fractional flow of oil from the zone.

It was found that in a basic process where a sand-pack is treated with treatment fluid (without following the treatment fluid with brine) and then brine is back-flowed, there can be incomplete mixing between the brine and the treatment fluid. In several experiments, we observed that only 30% of the active component (i.e. the dissolved compound) injected in the treatment fluid was retained (as a precipitate) in the sand pack after brine backflow, i.e. about 70% of the active component was recovered in the effluent samples recovered during the backflow phase.

Thus, although the basic process selectively reduces permeability to water/brine and may be used to reduce water production during oil recovery operations, it can to some extent be inefficient because much of the dissolved compound remains unprecipitated owing to limited mixing between treatment fluid and backflowing brine.

An improved process was designed to increase mixing between brine and treatment fluid, in which the active component retention (i.e. the proportion of injected active component which is retained in the core after backflow to steady state) is significantly increased. The improved treatment process has two steps:

(a) treatment fluid is injected;

(b) a brine "postflush" is injected.

The volume ratio of treatment fluid:brine postflush can be varied. Typical volume ratios are in the range 3:1 to 1:1.

Precipitate formation can be ensured, increased and/or stabilised if the injection of treatment fluid is followed by injection of water or brine into the formation. The water or brine may contain dissolved ions such as $Mg^{2+}$ and $Ca^{2+}$, which assist precipitation in some embodiments. Preferably, brine is used. Consequently, the active component retention is expected to be higher compared to a simple treatment without subsequent brine injection.

During step (b), brine is expected to finger through the treatment fluid and induce precipitation during injection. In addition, during the backflow phase, the treatment fluid is between two banks of water. It will therefore more efficiently mix with brine during the backflow phase.

It is important to note that such a follow-up injection of water or brine can cause precipitation in the oil zones as well as in the water zones. However, the precipitate is oil soluble. Thus, any precipitate which forms in oil zones can be redissolved by a high fractional flow of backflowing oil, thereby allowing the hydrocarbon production to be maintained while still selectively blocking water production from the watered out zones of the formation.

Repeat treatments interspersed with water or brine may be used to further increase the extent of active component retention, e.g. a series of alternating injections of treatment fluid and brine, respectively. Injections of treatment fluid and brine may be repeated once, twice, or more than twice. Each successive treatment can progressively increase the hydrocarbon/water production ratio.

Follow-up injection(s) of acidising fluid or acidic solution may be used-in methods of the invention. Precipitate formed by brine treatment, or formed on contact with back-flowing water and/or cations, diverts the acidising fluid into oil zone (s), thus inducing a selective permeability increase in the oil-rich layer(s)/zone(s). Such methods require the precipitate to be stable on contact with acidising fluid.

The divalent/trivalent metal carboxylate precipitates based on abietate or polymerised abietate are expected to be stable in strong acid as their parent acids, abietic acid or polymerised abietic acid are also oil-soluble, water-insoluble waxy solids with high melting points. In contrast, the divalent/trivalent metal carboxylates based on the α-branched non-cyclic compounds, e.g. calcium neo-decanoate, are not expected to be stable in acid as the corresponding parent acid, neo-decanoic acid (VERSATIC™ 10), is a liquid at room temperature.

Where the precipitate is abietic acid or polymerised abietic acid, one or more follow-up injections of acidising fluid or acidic solution may be used to promote precipitation. These may be used as well as or instead of injection of brine in the above methods. An acidic brine solution may be used.

Thus, methods of the invention may comprise: (a) injection of the treatment fluid; and (b) injection of acidising solution. Injection of acidising solution may follow an injection of brine, or may comprise injection of acidified brine solution.

The method may comprise: (a) injection of the treatment fluid; (b) injection of brine; and (c) injection of acidising solution.

DESCRIPTION OF THE DRAWINGS

The invention will now be described in more detail, with reference to the drawings in which:

FIG. 7 illustrates data from Berea sandstone experiments performed at ambient temperature.

FIG. 8 illustrates data from Berea sandstone experiments at 60° C.

DETAILED DESCRIPTION

Example 1

Figure 1A:
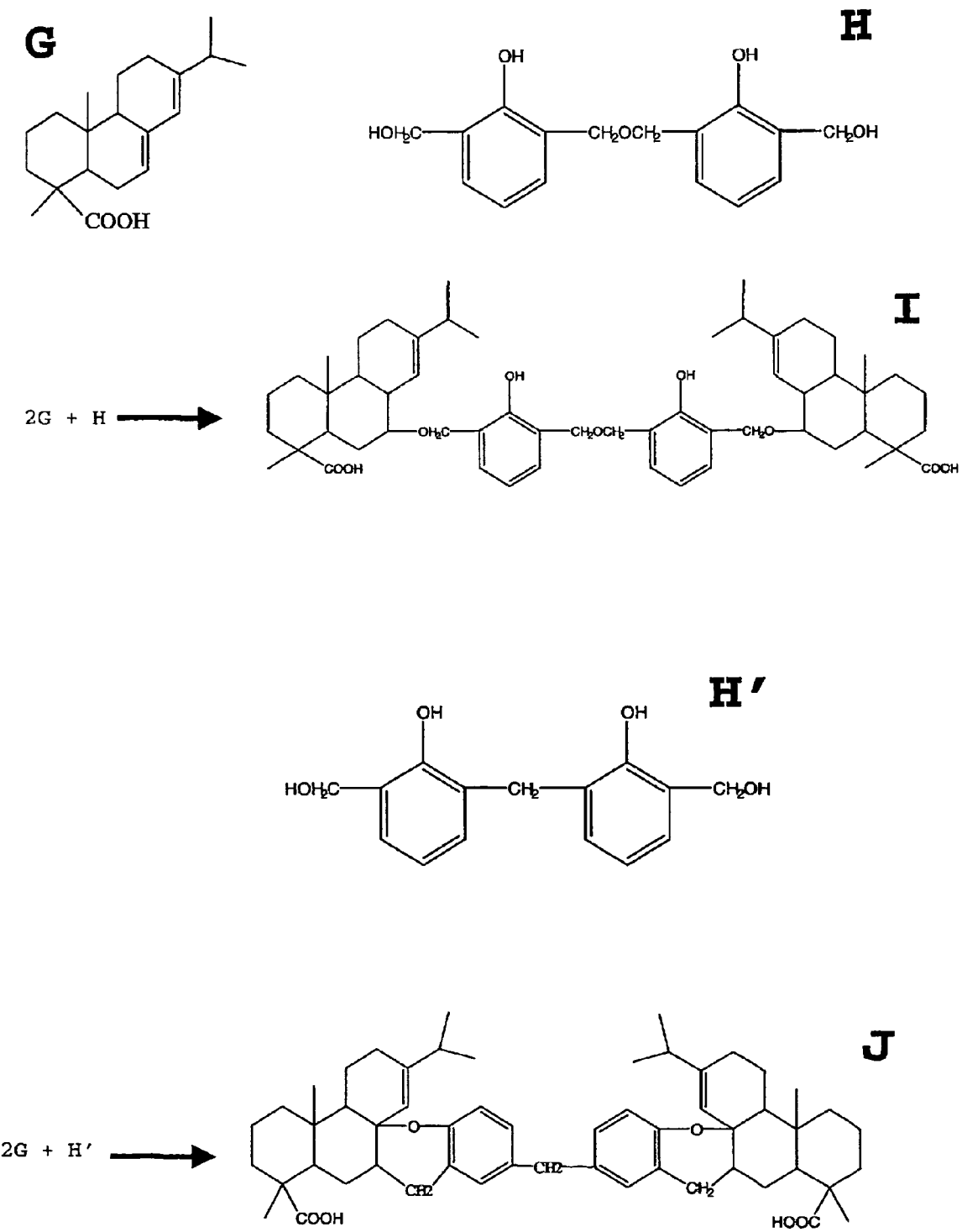
FIGS. 1A-1D shows examples of phenolic-modified resins and other resins, and their synthesis.
Figure 1B:
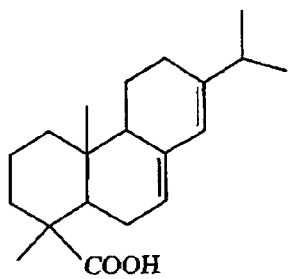
Figure 1B:
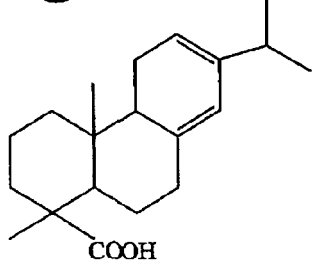
Figure 1B:
Figure 1B:
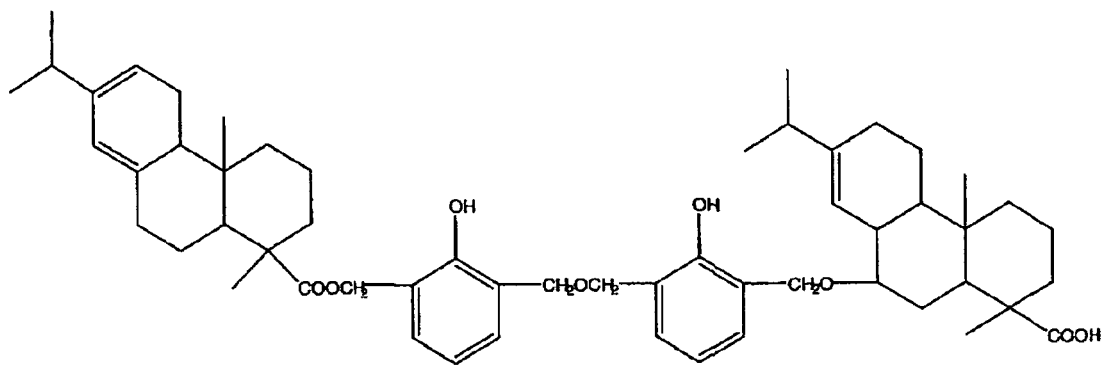
Figure 1B:
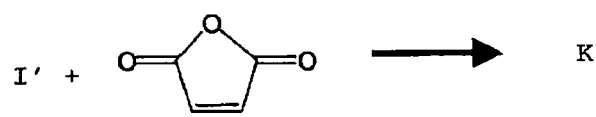
Figure 1B:
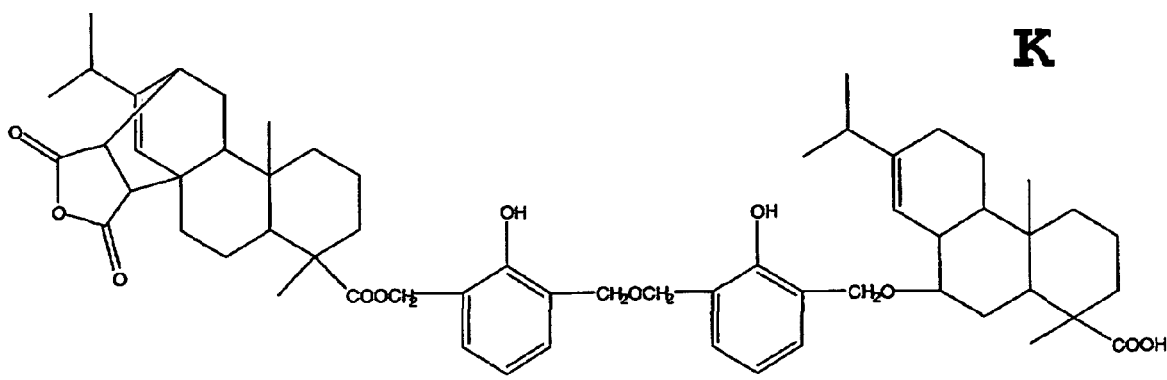
Figure 1C:
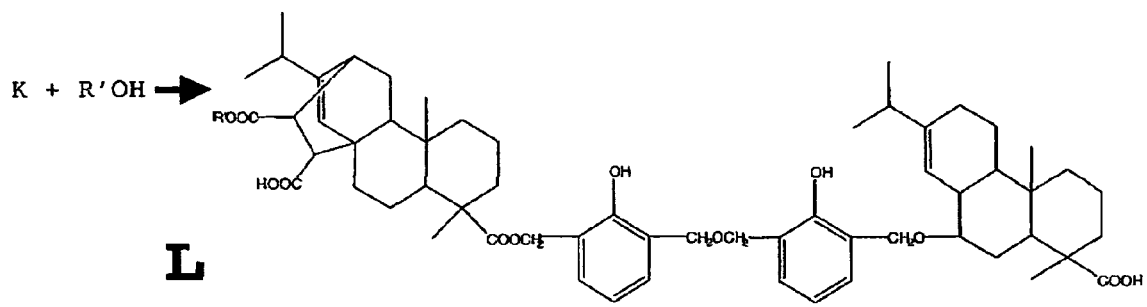
Figure 1C:
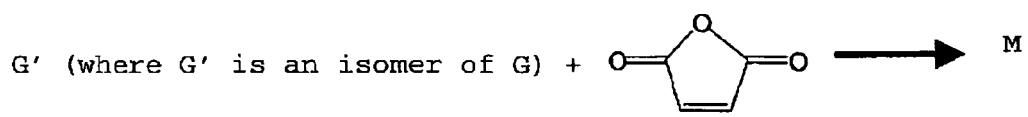
Figure 1C:
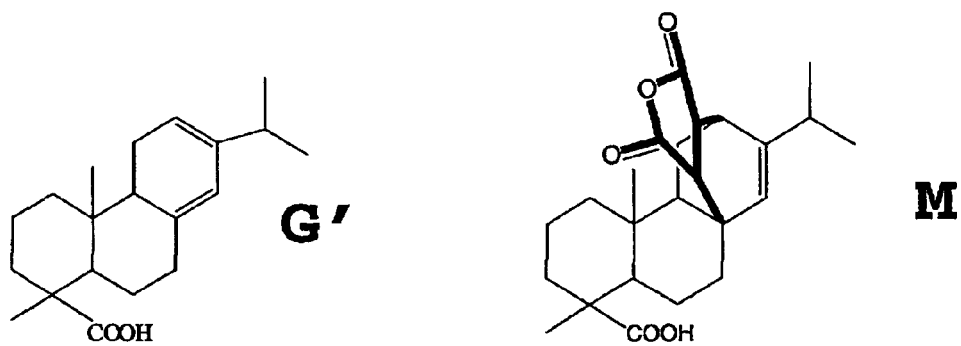
Figure 1C:
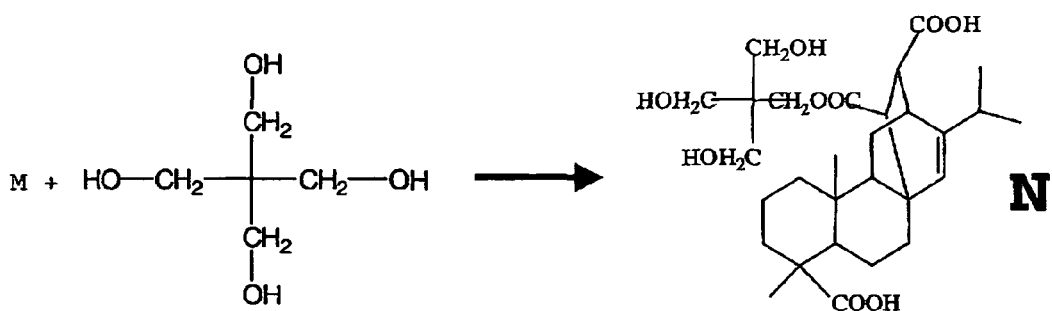
Figure 1D:
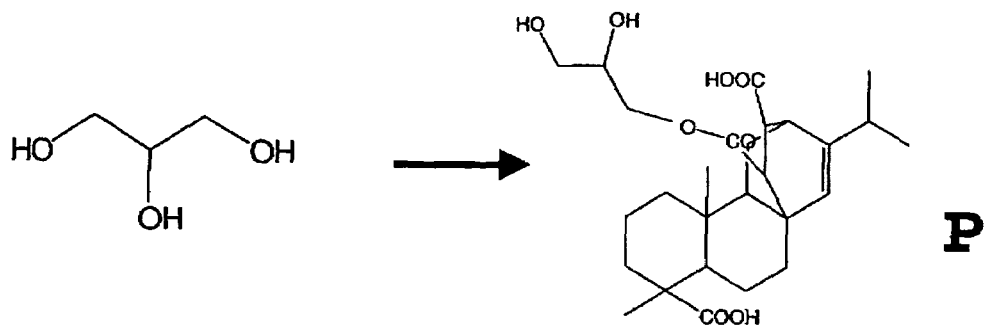
Figure 1D:
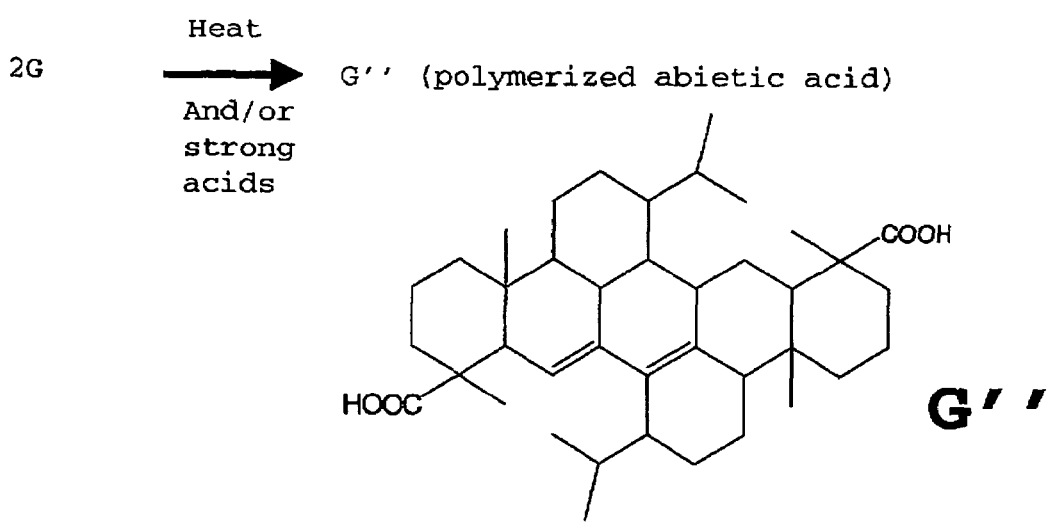
Figure 1D:
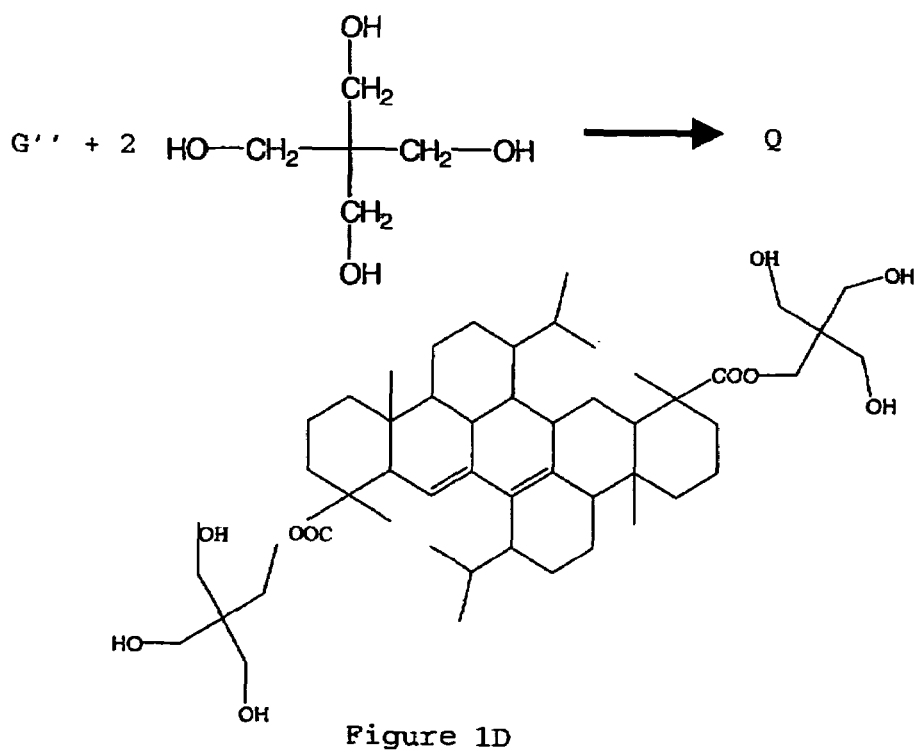

Preparation of Divalent Metal Carboxylate Salt, $(R_1COO)_2M$, from Corresponding α-Branched Saturated Carboxylic Acid The synthetic α-branched saturated carboxylic acids, neo-$C_9H_{19}COOH$, neo-$C_{12}H_{25}COOH$ and the neo-$C_9H_{19}COOH$/neo-$C_{17}H_{35}COOH$ mixture are converted to divalent metal carboxylate salts by the following procedure. 500 mL of a 2 mol/L aqueous solution of NaOH is mixed with 200 mL deionised water in a 2 L beaker. Whilst continuously stirring the solution, 1 mole of the α-branched carboxylic acid (e.g. 172.3 g (189.1 mL) VERSATIC™ 10) is slowly added and then the volume of the solution is made up to 1 liter using deionised water. At this point, if necessary, the pH is adjusted to a value in the range 9-9.5. In this pH range, the solution should be clear as all the water-insoluble carboxylic acid has been converted to carboxylate anion:

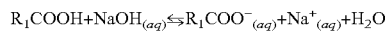

$R_1COOH + NaOH_{(aq)} \leftrightarrows R_1COO^-_{(aq)} + Na^+_{(aq)} + H_2O$

If the pH of the aqueous solution of sodium carboxylate exceeds the stated range, Ca(OH)$_2$ will be co-precipitated in the next step. 1 liter of a 0.55 mol/L aqueous solution of CaCl$_2$ is added to the 1 liter of 1 mol/L aqueous solution of sodium carboxylate; this step precipitates the calcium carboxylate salt via the following reaction:

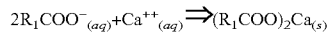

$2R_1COO^-_{(aq)} + Ca^{++}_{(aq)} \Rightarrow (R_1COO)_2Ca_{(s)}$

An excess of Ca is used to ensure that all the carboxylate precipitates. The precipitate is filtered and washed with deionised water; it is then vacuum-dried or dried in an oven at 60° C.

The dried calcium salt of VERSATIC™ 10 is a whitish waxy-crystalline solid.

This procedure was used to prepare most of the divalent metal carboxylate salts listed in Table 1 including calcium pivalate, calcium decanoate, calcium neo-decanoate, calcium neo-tridecanoate, calcium oleate and calcium versatate 10/18.

Example 2

Water, Oil and Solvent Solubilities

Table 1 compares the solubility (at T=25° C.) of a range of compounds in brine, several different oils and in a range of glycol ethers and alcohols. Solubility was assessed by (i) preparing a series of mixtures containing various concentrations of the compound in brine, oil or solvent in 100 mL bottles, (ii) heating and equilibrating the mixtures at 60° C., (iii) cooling to 25° C. and (iv) visually inspecting any residual material; if an insoluble residue is observed, this was filtered out from the solution and its weight is determined.

For the case of abietic acid, calcium abietate (Dertocal), polymerised calcium abietate (MERIGRAL™) and the phenolic modified resins (RESENOL™ and GRANOLITE™), insoluble residues were removed by filtration and the numbers given in Table 1 relate to the soluble fraction after filtration.

TABLE 1

Solubility of various calcium carboxylate salts in brine, oils and various solvents

| Compound | Brine[1] wt % | Oil wt % | Solvent wt % (solvent chemistry) |
|---|---|---|---|
| *Ca Pivalate (VERSATIC™ 5) | 5 | 0.01[2] | 2.0 (DPM[3]) |
| *Ca Decanoate (dry) | 0.1 | 0.1[2] | 0.1 (EB[4]) |
| *Ca Decanoate (wet[A]) | 0.1 | 0.1[2] | 0.1 (EB[4]) |
| *Ca neo-Decanoate (VERSATIC™ 10) (dry[B]) | 0.5 | 0.5[2] | Glycol ethers: ≧30 (DPM[3]), ≧30 (EB[4]), ≧30 (PnB[5]). Alcohols: ≧30 (IPA[6]), ≧30 (butan-1-ol), ≧30 (butan-2-ol), ≧30 (octan-1-ol), 0.5 (1,3-butanediol), Ketones: ≧30 (4-hydroxy 4-methyl 2-pentanone). |
| *Ca neo-Decanoate (VERSATIC™ 10) (wet[C]) | <0.83 | ≧5.8[2] | ≧10.8 (EB[4]) |
| *Ca neo-Decanoate (VERSATIC™ 10) (wet[D]) | <0.45 | ≧4.5[2], =4.5[7] | ≧6.8 (EB[4]) |
| *Ca neo-Tridecanoate (dry) | 0.5 | 0.5[2] | ≧30 (EB[4]) |
| *Ca neo-Tridecanoate (wet[E]) | 0.5 | 0.5[2] | |
| **Ca stearate | 0.05 | 0.3[2] | 0.1 (EB[4]) |
| *Ca Oleate | 0.3 | 0.5[2] | 1 (EB[4]) |
| *Ca Versatate 10/18 (wet[F]) | 0.01 | ≧10[2] | ≧30 (DPM[3]) |
| **Ca Abietate (DERTOCAL™) | 0.01 | >10[2], ≧50.0[7], ≧50.0[8] | ≧50 (DPM[3]), ≧30 (EB[4]) |
| **Polymerised Ca/Zn Abietate (MERIGRAL™) | 0.01 | >10[2], ≧50.0[7], ≧50.0[8] | ≧30 (DPM[3]), ≧25 (EB[4]) |
| **Abietic Acid | 0.01 | ≧6.5[7], ≧5–10[8] | ≧30 (DPM[3]), ≧30 (EB[4]) |
| **Camphor | very low | ≧50.0[7] | ≧50.0 (DPM[3]) |
| **[(1S)-endo]-(−)-Borneol | very low | 9.0[7] | ≧50.0 (DPM[3]) |
| **RESENOL™ 9070 (Phenolic modified resin) | very low | ≧11.0[7] | ≧35 (DPM[3]), ≧35 (EB[4]) |
| **GRANOLITE™ 5758 (Phenolic modified resin) | very low | ≧7.0[7] | ≧35 (DPM[3]), ≧35 (EB[4]) |

Footnotes to Table 1:
*prepared as per procedure described in example 1.
**commercially available: Ca stearate (Fischer Chemicals); Ca abietate, polymerized Ca/Zn abietate (Les Dèrivès Rèsiniques & Terpèniques S.A.); abietic acid (Sigma-Aldrich Corp.); Camphor, Borneol (Sigam-Aldrich Corp.).
[1]brine = 1 mol/L NaCl.
[2]Mineral spirits, bp 179–210° C. (Sigma-Aldrich Corp.) - mixture of branched alkanes $C_9$ to $C_{11}$.
[3]DPM: Dipropylene glycol methyl ether (DOWANOL™ DPM).
[4]EB: Ethylene glycol butyl ether (2-butoxyethanol; DOWANOL™ EB).
[5]PnB: Propylene glycol butyl ether (2-butoxy-propan-1-ol; DOWANOL™ PnB).
[6]IPA: isopropanol (propan-2-ol).
[7]Halpasol 190/240 - mixture of n-alkanes $C_{10}$, $C_{12}$ and $C_{14}$ and minor concentration of branched hydrocarbons.
[8]Finalan 75 - mixture of linear & branched hydrocarbons $C_{10}$–$C_{14}$ plus a significant cyclic hydrocarbon content.
[A]55 wt % water
[B]3 wt % water
[C]17 wt % water
[D]55 wt % water
[E]55 wt % water
[F]20 wt % water
Note:
when carboxylate salt is in a wet state, the quoted solubility is active (dry) weight percentage dissolved.

The calcium salts of the linear saturated carboxylic acids, calcium decanoate and calcium stearate show low solubility in the brine, oils and various solvents. The introduction of a double bond in the hydrocarbon chain (e.g. calcium oleate relative to calcium stearate) results in a slight increase in solubility in the brine, oils and glycol ether solvents. However, the introduction of α-branching in the hydrocarbon chain (e.g. calcium neo-decanoate relative to calcium decanoate or calcium versatate 10/18 relative to calcium decanoate/stearate) results in a considerable increase in solubility in the oils and the various solvents. It seems that a high solubility (direct dissolution) in oil is promoted by:

(i) a minimum number of carbon atoms in the α-branched chain (compare data for calcium neo-decanoate ($C_{10}$) with calcium pivalate ($C_5$)) and (ii) the omnipresence of water (compare calcium neo-decanoate ($C_{10}$) in the fully dried (water content 3 wt %), partially dried (water content 17 wt %) and non-dried (water content 55 wt %) states.

The latter suggests that the formation of a water-in-oil microemulsion can increase the oil solubility of calcium salts of α-branched carboxylic acids with 10 to 18 carbon atoms. A possible explanation is that the presence of water allows the carboxylic acids to dissolve by reverse micellisation. The carboxylic acids arrange themselves with their polar head groups directed towards water and their hydrocarbon tails directed towards oil. This results in the formation of a number of reverse micelle structures consisting of a globe of aligned carboxylates extending from a water-filled centre, surrounded by the oil. Reverse micellisation allows the charged carboxylate head groups and co-ions to be solvated by water. When insufficient water is present the micelles cannot form and the carboxylic acid becomes less soluble in oil.

In contrast, the presence of water does not apparently increase the solubility of calcium neo-decanoate or calcium versatate 10/18 in glycol ethers and various alcohols. That may be because the glycol ethers and alcohols are miscible with water, so the presence of water does not cause reverse micelle formation. For solubility in solvent, therefore, the material can be dry or wet.

It is also notable that the oil solubility of calcium tridecanoate is not enhanced by the presence of water, suggesting some dependence on the structure of the α-branched linear chain and side groups. It is possible that some or all of the calcium tridecanoate used in the study had a single propyl side group rather than a pair of methyl and ethyl side groups, which would further complicate the structure.

The commercially available abietic acid, calcium abietate, polymerized calcium/zinc abietate and phenolic modified resins show a very low solubility in water, high solubility in glycol ether solvents and high solubility in oil. The composition of the oil will affect the solubility of these compounds and it is known that aromatic oils are also good solvents for these compounds (e.g. DRT report that DERTOCAL™ 140 and MERIGRAL™ CB are soluble to 50 wt % in toluene).

Figure 2:
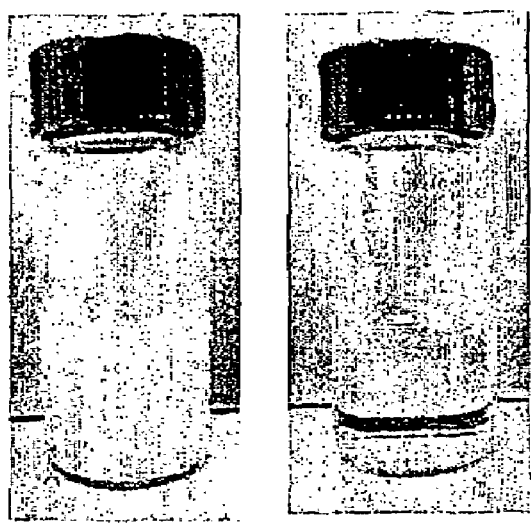
FIG. 2 shows the results of an experiment to compare the solubility at 25° C. in di(propylene glycol) methyl ether ("DOWANOL™ DPM") of 5 wt % calcium pivalate and 20 wt % calcium neo-decanoate. LEFT: 5 wt % calcium pivalate (prepared from VERSATIC™ 5); RIGHT: 20 wt % calcium neo-decanoate (prepared from VERSATIC™ 10).

FIG. 2 compares solubility of calcium pivalate and dry calcium neo-decanoate in di(propylene glycol) methyl ether (Dow Chemical DOWANOL™ DPM) at T=25° C. The bottle on the left in FIG. 2 contains 5 wt % calcium pivalate (prepared from VERSATIC™ 5), and its contents appear white, showing that the calcium pivalate salt has not dissolved. The bottle on the right contains 20 wt % calcium neo-decanoate (prepared from VERSATIC™ 10), and its contents appear colourless and transparent, with no visible precipitate.

Example 3

Selective Response of Solvent-Based Calcium Carboxylate Solutions to Additions of Oil or Brine In well-mixed bottle tests, the solvent-based solutions of calcium salts of α-branched carboxylic acids show a selective response to increasing dilution with oil or brine. When oil is mixed with the solvent-based solution, the calcium carboxylate salt remains in solution and the mixture forms one or two clear phases depending on the miscibility of the solvent with the oil and the degree of dilution by oil. When a critical concentration of brine is mixed with the solvent-based solution, the calcium carboxylate forms an oil-soluble water-insoluble waxy precipitate and again the mixture may form two separate liquid phases depending on the miscibility of the solvent with the brine and the degree of dilution by brine. Thus, such a selective treatment fluid is expected to allow the flow of oil but to restrict the flow of water due to the selective precipitation of a flow-resistant waxy solid phase in the presence of a high water saturation.

For example, solutions of calcium neo-decanoate in DPM were tested for their response to increasing dilution by oil (mineral spirits) or brine (1 mol/L NaCl). In this case, the DPM solvent is 100% miscible with oil or brine. On addition of the oil, the treatment fluid remains as a clear one phase solution. When a critical concentration of brine is added, a waxy precipitate is formed. The critical concentration of brine required to induce precipitation varies with the concentration of calcium neo-decanoate predissolved in the solvent, as shown in FIG. 3.

Figure 3:
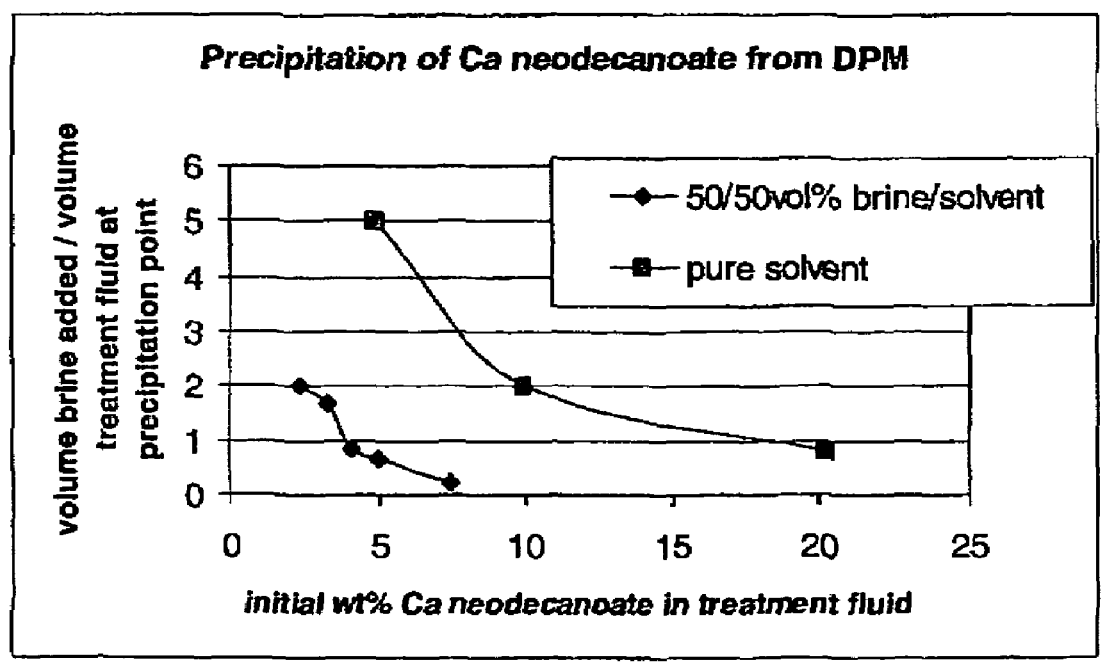
FIG. 3 is a graph showing the precipitation of Ca neodecanoate from DPM. The y axis represents the ratio of the volume of brine added to the volume of treatment fluid at the precipitation point. The x axis represents initial wt % of Ca neodecanoate in treatment fluid. The diamond-shaped points represent results when the treatment fluid comprises Ca neodecanoate dissolved in pure DPM solvent. The larger square points represent results when the treatment fluid comprises Ca neodecanoate dissolved in 50/50 vol % brine:DPM solvent.

The graph in FIG. 3 shows that as the initial concentration of calcium neo-decanoate in the treatment fluid increases, the concentration of brine required to induce precipitation decreases. When the treatment fluid contains 20 wt % calcium neo-decanoate in pure DPM solvent, a 1:1 dilution with brine is required to form a heavy precipitate. In contrast, when the treatment fluid contains 5 wt % neo-decanoate, a 5:1 dilution with brine is required to induce precipitation. This behaviour shows that the fluid can be designed with a low or high tolerance to brine dilution depending on the characteristics of the treatment zone(s). The same behaviour leads to the potential of using treatment fluids based on a mixture of solvent and brine and, as shown in FIG. 3, such fluids show a similar dependence of their precipitation behaviour on the initial concentration of calcium neo-decanoate. The potential for using fluids based on a solvent/brine mixture provides an advantage in terms of fluid cost and overall treatment efficiency.

Relative to the behaviour shown in FIG. 3, when the DPM solvent is replaced by 4-hydroxy 4-methyl pentanone or by isopropanol, a higher dilution with brine is required to form the precipitate.

Further examples of the selective response to increasing dilution with oil or brine are provided by equivalent tests performed using treatment fluids containing calcium neo-tridecanoate, calcium versatate 10/18, abietic acid, calcium abietate (DERTOCAL™) and polymerized calcium/zinc abietate (MERIGRAL™). A summary of the tests is given in Table 2.

TABLE 2

Selective behaviour of candidate treatment fluids in well-mixed bottle tests

| Dissolved calcium carboxylate salt | Solvent | Behaviour on dilution with brine | Behaviour on dilution with oil (mineral spirits) |
|---|---|---|---|
| 10 wt % Ca neo-decanoate | Pure DPM | Pptn. when [brine] = 67 vol % | No pptn., one clear phase |
| 5 wt % Ca neo-decanoate | 50 vol % DPM/50 vol % brine | Pptn. when [brine] increased from 50 to 70 vol % | No pptn., two clear phases |

TABLE 2-continued

Selective behaviour of candidate treatment fluids in well-mixed bottle tests

| Dissolved calcium carboxylate salt | Solvent | Behaviour on dilution with brine | Behaviour on dilution with oil (mineral spirits) |
|---|---|---|---|
| 10 wt % Ca tri-decanoate | Pure DPM | Pptn. when [brine] = 70 vol % | Two clear phases but light ppt. at interface |
| 10 wt % Ca versatate 10/18 | Pure DPM | Pptn. when [brine] = 33 vol % | No pptn., one clear phase |
| 5 wt % Abietic Acid | Pure DPM | Pptn. when [brine] = 33 vol % | No pptn., one clear phase |
| 5 wt % Ca abietate (Dertocal) | Pure DPM | Pptn. when [brine] = 23 vol % | No pptn., one clear phase |
| 5 wt % polymerized Ca/Zn abietate (Merigral) | Pure DPM | Pptn. when [brine] = 5 vol % | One clear phase but light ppt. formed after 12 hr.; when oil is Finalan 75, no ppt. observed. |

The data indicate that, when the solvent is DPM, the brine concentration required to induce precipitation increases through the following series:

Polymerized Ca/Zn abietate<calcium abietate<abietic acid<Ca versatate 10/18<Ca neo-tridecanoate=Ca neo-decanoate The data given in Tables 1 and 2 was determined at T=25° C. In all cases, a slightly higher brine saturation is required to induce precipitation of the waxy precipitate in equivalent tests performed at 60° C. and 80° C. Little or no precipitation is observed on dilution with oil. The α-branched calcium carboxylate chemistry is expected to be applicable in reservoirs with a broad range of temperature as the precipitates have high melting points:
Polymerized Ca/Zn abietate melts at 180° C.
Calcium abietate melts at 140° C.
Abietic acid melts at 139° C.
Ca versatate 10/18, Ca neo-tridecanoate and Ca neo-decanoate all have melting points >140° C.
The phenolic modified resins also have high melting points (e.g. RESENOL™ 9070: 170° C.; GRANOLITE™ 5758: 180° C.).
Interestingly, both calcium abietate and abietic acid have high melting points indicating that both the calcium and acid forms will form a stable precipitate in reservoirs with a broad temperature range. In contrast, whilst their calcium salts have high melting points, VERSATIC™ 10, VERSATIC™ 10/18 and tridecanoic acids are all liquids at ambient temperature.

Example 4

Selective Response in Porous Media

Figure 4A:
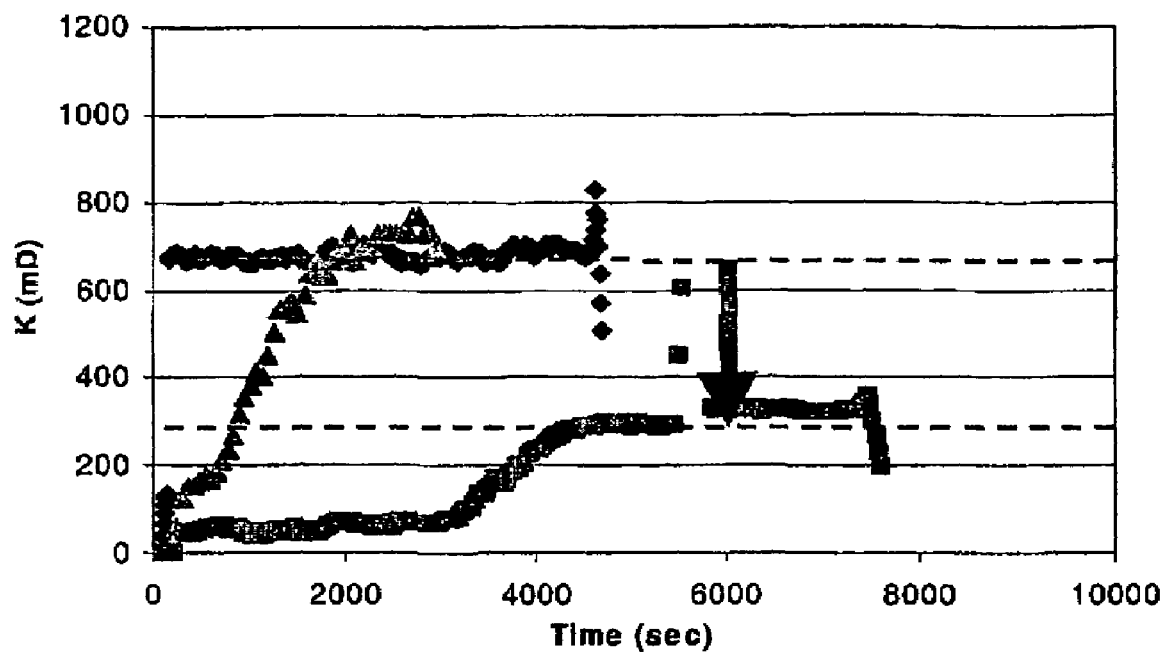
FIG. 4 shows the selective response to water and solvent of treatment fluids in 700 mD sandpacks. Permeability, K (mD) is on the y axis and time (sec) is on the x axis. (a) Water zone. Dark grey (diamonds) is brine permeability (pre-treatment), mid-grey (triangles) is pure solvent treatment (CONTROL experiment), light grey (squares) is treatment fluid (20 wt % Ca abietate in pure solvent). (b) Oil zone. Dark grey (diamonds)is oil permeability (pre-treatment), mid-grey (triangles) is pure solvent treatment (CONTROL experiment), light grey (squares) is treatment fluid (20 wt % Ca abietate in pure solvent). Quoted permeabilities relate to the full length of the pack although the treatment fluid was injected in only ⅔ of the full length; therefore, the permeability reduction due to precipitation in the water zone is actually greater in the treated zone compared with the full length.
Figure 4B:
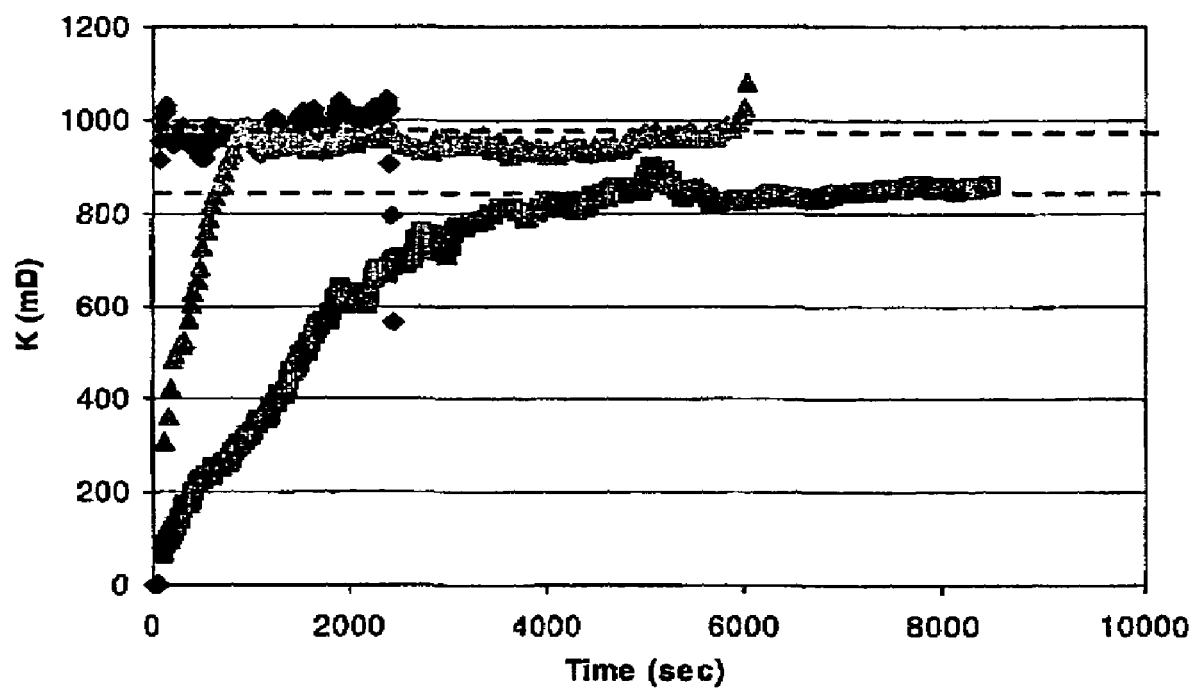

Candidate solvent-based treatment fluids were evaluated in porous media. For example, FIG. 4 shows the results for the treatment fluid: 20 wt % calcium abietate in the solvent DPM (all experiments were performed at 25° C.). Duplicate two feet long sandpacks were prepared using a specific blend of sand and silica flour.

Water Zone (FIG. 4a): The first pack was flooded with brine (1M NaCl) and its brine permeability was determined to be 700 mD (refer to data in dark grey (diamonds)).

At this point, pure DPM solvent was injected to 1.33 ft (injected solvent volume=0.66×pore volume). After solvent injection, brine (1M NaCl) was backflowed to remove the solvent treatment (refer to data shown in mid-grey (triangles)). The original permeability to brine was completely recovered after 30 minutes flow at a constant pressure gradient 20 psi/ft. At this point the same pack was treated to 1.33 ft with 20 wt % calcium abietate in DPM. Again, after injection of the treatment fluid, brine (1M NaCl) was backflowed at a constant pressure gradient 20 psi/ft (refer to data shown in light grey (squares)). This time a significant delay in achieving steady-state flow and a significant reduction in the steady-state permeability to brine occurred. The permeability to brine is reduced by a factor of 2.3. If we correct the permeability for treatment depth then it becomes 2.8 (65% reduction).

Oil zone (FIG. 4b): The second pack was flooded with oil and its oil permeability was determined to be around 950 mD (refer to data in dark grey (diamonds)). As described for the water zone, the same volume of pure solvent was injected into the oil core and then this was removed by backflowing oil at 20 psi/ft (refer to data in mid-grey (triangles); as shown, the oil permeability-was rapidly and completely recovered. The oil core was then treated with the same volume of 20 wt % calcium abietate in DPM and backflowed with oil at 20 psi/ft; as shown, the oil permeability was recovered.

Thus, the treatment fluid can be used to achieve a selective reduction in brine permeability. A repeat experiment for the water zone gave permeability reduction factors of 2.5. Again, if we correct the permeability for treatment depth then it becomes 3.2 (69% reduction). Repeat experiments for the oil zone showed that the oil permeability was completely recovered. Chemical analysis of the effluent collected during backflow indicated that calcium abietate was being retained in the water core but not in the oil core. In addition, a post-backflow analysis of the water core (involving analysis of treated and non-treated sections) showed the presence of calcium abietate precipitates in the treated zone.

Experiments were used to evaluate a treatment fluid containing 5 wt % calcium abietate pre-dissolved in a DPM/brine mixture. Again, the permeability of the water zone was damaged by a factor of 1.8. If we correct the permeability for treatment depth then it becomes 2.2 (54% reduction). There was no effect on permeability to oil in an equivalent oil zone. It has also been demonstrated that the waxy solid damaged water zone can be cleaned up to its original permeability by flooding with pure solvent to re-dissolve the precipitated material.

We note that it is possible to increase the extent of permeability reduction in the water zone by varying the treatment process/procedure. For example, we have investigated the effect of following the treatment fluid with a brine injection and the effect of multiple treatments on the same zone.

Example 5

Oil Clean-Up

Sandpack experiments were performed to evaluate the recovery of oil permeability after brine-induced precipitation.

Figure 5:
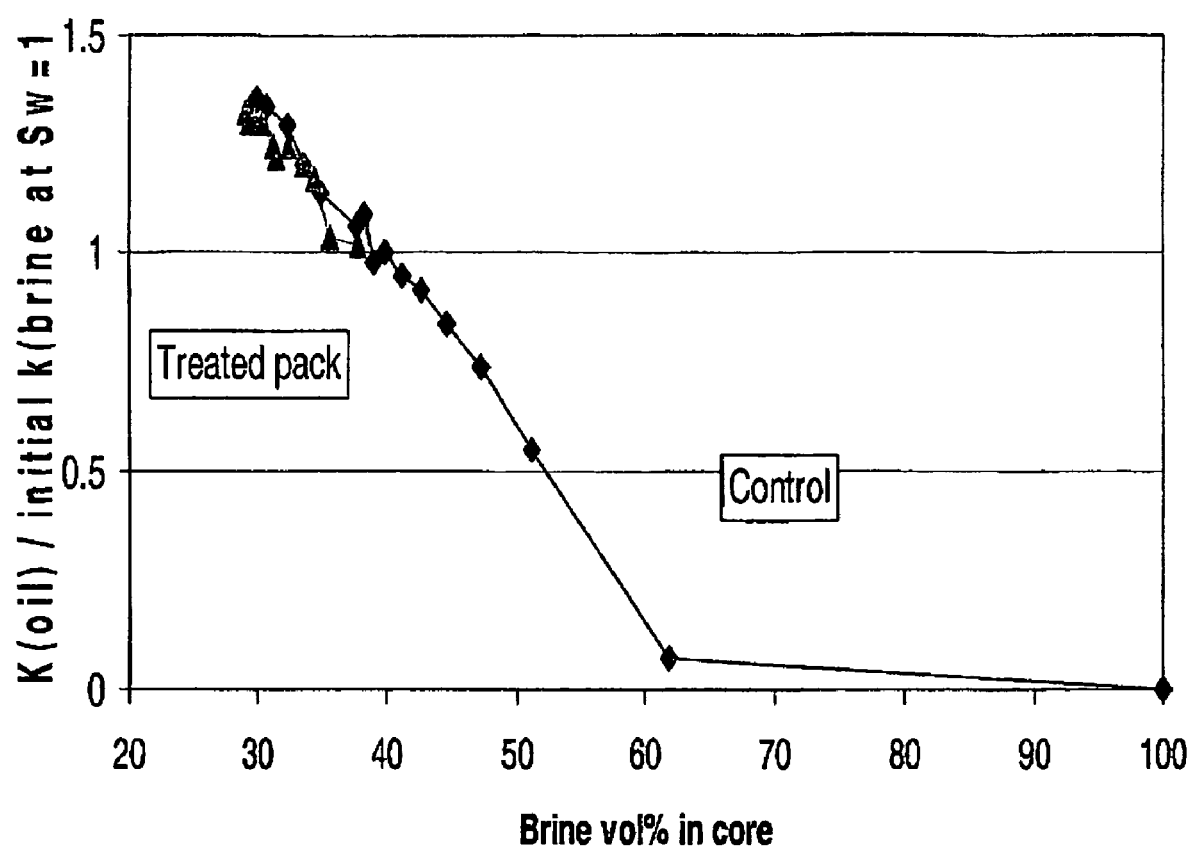
FIG. 5 shows the variation of the relative oil permeability (vertical axis) versus the water saturation in the sandpack. It demonstrates that after the water permeability has been reduced to a steady-state condition during brine backflow, if the backflow fluid is changed to oil then the permeability damage due to the precipitate is removed as the backflowing oil flows through the core and in so doing dissolves the precipitate.

The results are shown in FIG. 5. The permeability ratio K(oil)/initial K(brine) is shown on the vertical y axis and this is plotted against the brine saturation (vol %) in the core.

The dark curve plotted with diamonds relates to the experiment wherein the starting point is a 10-ft pack saturated with brine ($S_w$=1, brine permeability $K_w$=960 mD). Oil is then flushed through it until the steady state is reached. During this operation, the water saturation in the pack decreases as water is mobilized and removed by the flow of oil. The oil permeability ($K_o$) is determined regularly during the process. The ratio K(oil)/initial K(brine) is then calculated and plotted against the water saturation. The oil permeability at steady state is 1300 mD, which gives $K_o/K_{wi}$=1.35 at $S_w$=29.5%.

The lighter curve plotted with triangles relates to the experiment wherein the 10-ft pack is saturated with brine ($S_w$=1, brine permeability $K_w$=800 mD). Half of it is then treated with 5 wt % resinate (calcium abietate, Dertocal) dissolved in solvent (DPM). Brine is then backflowed through the pack until the steady state is reached. A 25% brine permeability reduction is observed. Then, oil is flushed through the pack until the steady state is reached ($K_o$=1061 mD). Again, the ratio K(oil)/initial K(brine) is calculated and plotted against the water saturation. At steady state, this ratio equals 1.33 at $S_w$=29%.

The lighter curve matches the darker one, which indicates that the damage (precipitate formation) has been removed.

The results show that the precipitated waxy solid can be cleaned up by oil backflow. Thus, if any precipitation was induced in the oil zones, it would, in time, clean-up.

Example 6

Brine Follow-Up Treatments

The selective response to injections of treatment fluid and brine was carried out in porous media.

An experiment was performed in a 2-ft sand pack at ambient temperature and $S_w$=1. The experiment consisted in a series of 3 pack treatments (using a process of treatment fluid injection followed by brine injection), followed by brine backflow between each of the three treatments. The fluid used was 10 wt % resinate (calcium abietate, Dertocal) dissolved in DPM.

Figure 6:
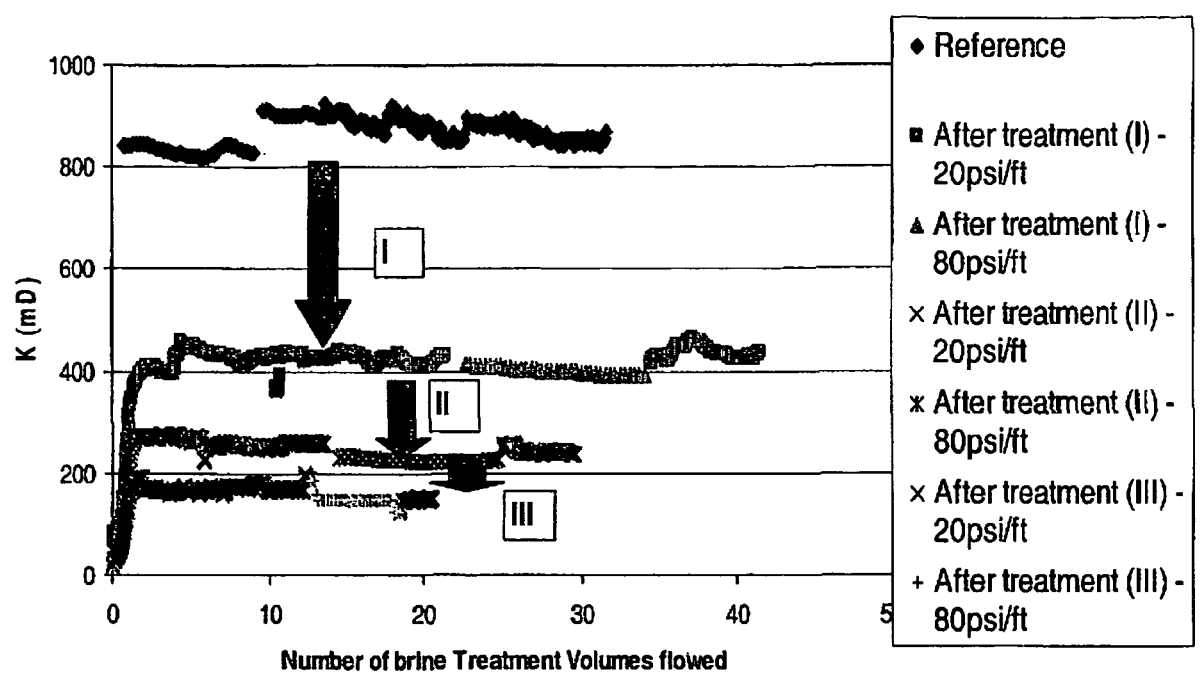
FIG. 6 shows data for a series of three 2 feet long sand pack treatments; each treatment involved treatment fluid injection followed by brine injection, followed by brine backflow to steady-state conditions. The figure shows the variation of brine permeability (K (mD) on vertical axis) in the pack versus the volume of brine back-flowed, where the volume of brine back-flowed is expressed as a multiple of the treatment volume. Downward arrows and boxed Roman numerals on the graph illustrate progressive reduction in brine permeability after treatments I, II and III, respectively. The top series of values (diamonds) are reference permeability before treatment I (870 mD). The second, third and fourth series of values down the graph (separated by the arrows) are after treatments I, II and III, respectively. Squares, X and + respectively represent the brine permeability variation after the first, second and third treatment (20 psi/ft). Triangles, dark line and pale grey line refer to a brine backflow performed at 80 psi/ft. The figure shows that the degree of $K_w$ (brine permeability) reduction increases as more solid is retained through treatments I to III.

FIG. 6A shows variation of brine permeability in the treated zone versus volume of brine flowed, at different steps of the process. The volume of the treated zone is ⅔ of the pore volume (⅓ treatment fluid+⅓ brine). As shown, permeability reduced with each treatment. Brine backflow at 80 psi/ft did not significantly alter permeability, indicating that the precipitate was able to resist a high pressure gradient.

FIG. 6B shows that the degree of $K_w$ (brine permeability) reduction increases as more solid is retained through treatments I to III.

Results are summarised in Table 3 below.

TABLE 3

| Treatment no. | $K_w$ (mD) | % Reduction (cumulative) |
|---|---|---|
| Before treatment | 870 | 0 |
| I | 450 | 51 |
| II | 240 | 72 |
| III | 150 | 88 |

As shown, each successive treatment lowered the permeability, although by a lower amount each time. There was very little difference between permeability at 20 psi/ft and at 80 psi/ft.

Example 7

Berea Sandstone Permeability Experiments

An experiment was performed in a 1 foot 250 mD Berea sandstone core at $S_w$=1, using a process of treatment fluid injection followed by follow-up brine injection.

Treatment fluid used: 10 wt % resinate (Calcium abietate, Dertocal) in solvent (DPM). The volume of the treated zone was ⅔ of the pore volume (⅓ treatment fluid+⅓ brine).

Brine permeability before treatment: 250 mD.

Figure 7A:
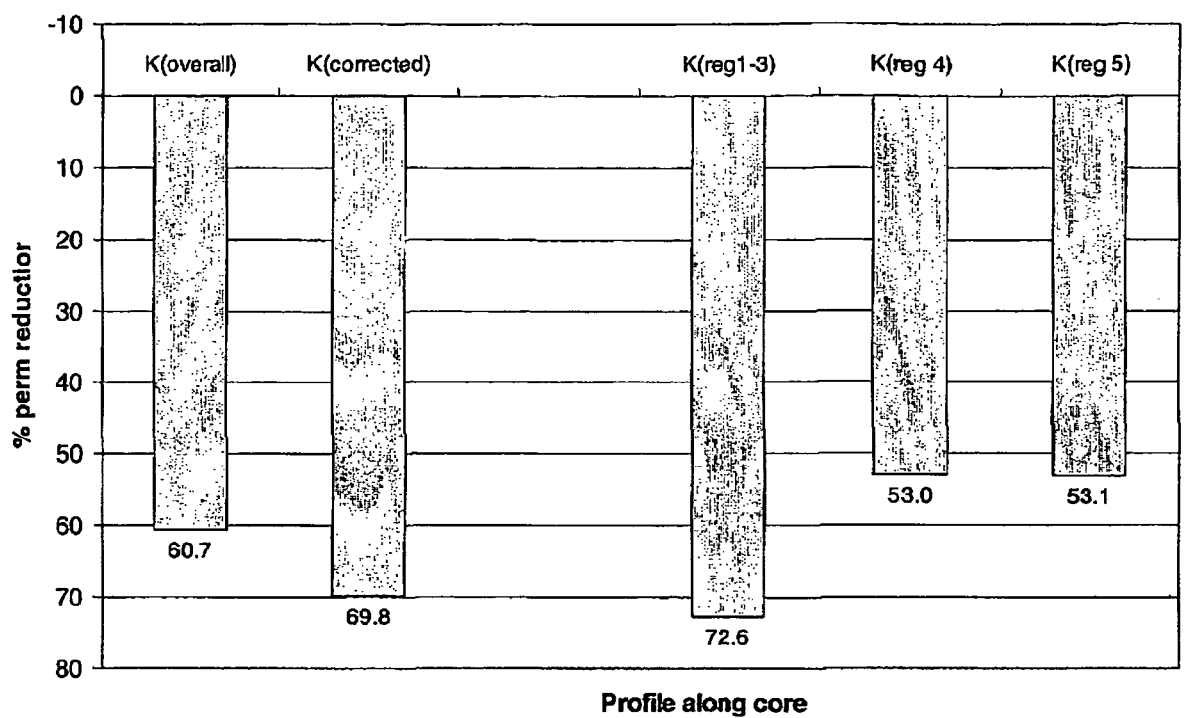
FIG. 7A shows reduction of brine permeability (%) at steady state after the backflow phase (20 psi/ft), overall and in different regions of the core.
Figure 7B:
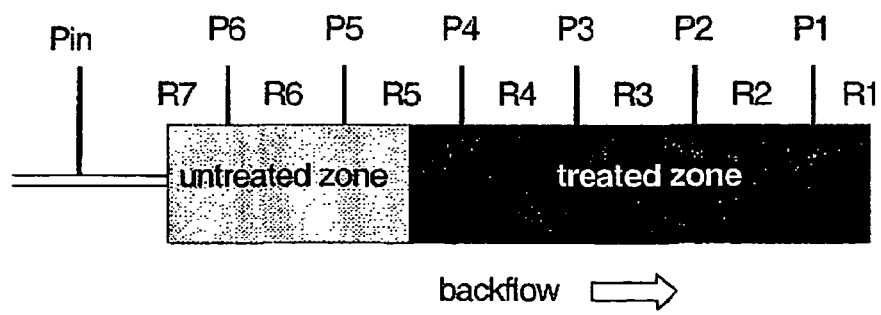
FIG. 7B is a schematic illustration of the core, with different regions labelled R1 to R7. The treated zone appears in black (R1-R2-R3-R4-part of R5). Respective treatments with treatment fluid and the brine postflush were flowed from right to left in the diagram shown, and brine was backflowed from left to right.

The experiment was carried out at ambient temperature, for which data are shown in FIGS. 7A and 7B. Brine permeability in the treated zone was reduced by 70%. The biggest damage (precipitation) appeared near the wellbore (region 1) where the reduction was 73%.

Damage was similar when the P gradient was raised to 40 psi/ft.

Figure 8A:
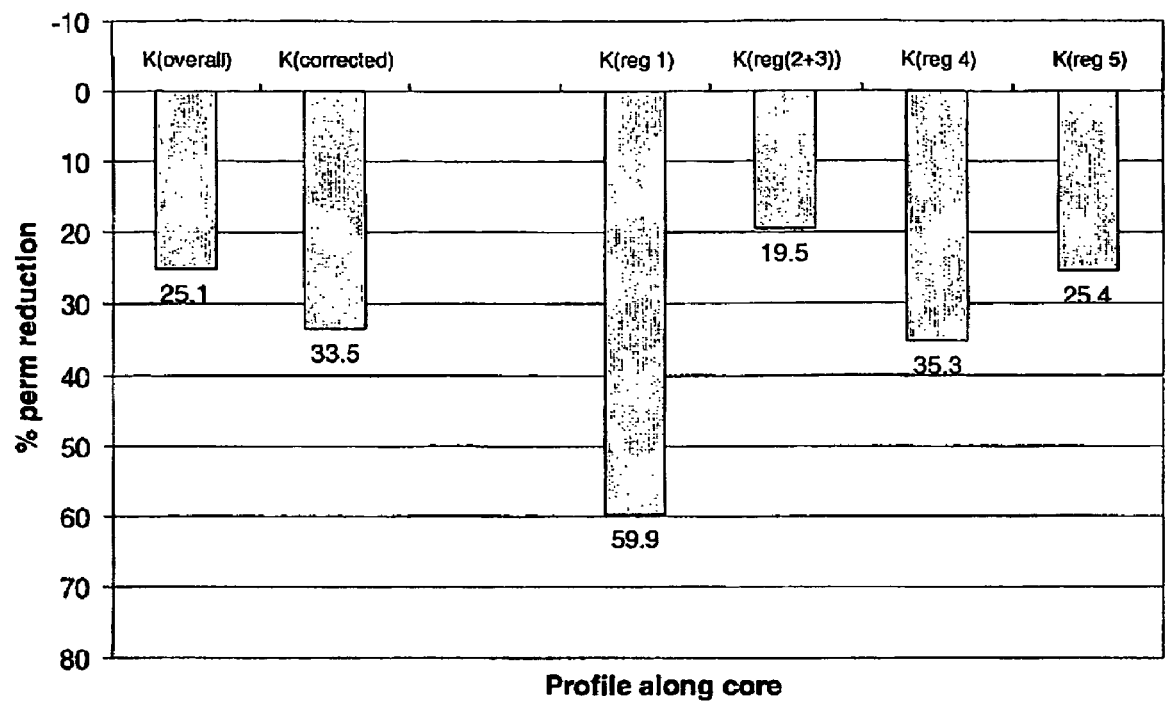
FIG. 8A shows reduction of brine permeability (%) at steady state after the backflow phase (20 psi/ft), overall and in different parts of the core.
Figure 8B:
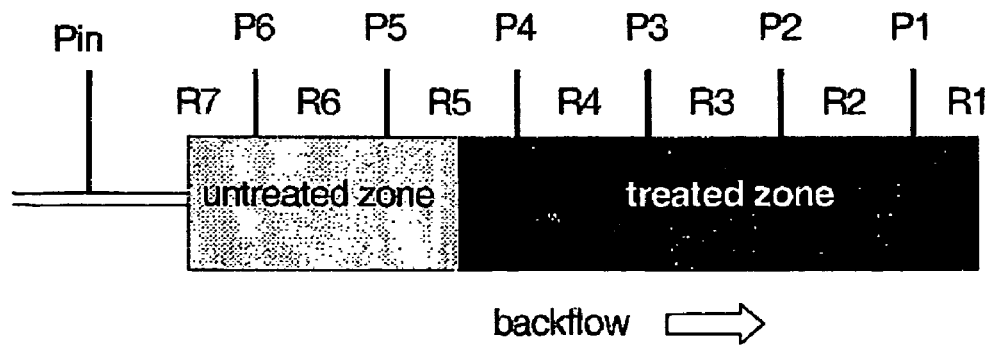
FIG. 8B is a schematic illustration of the core, with different regions labelled R1 to R7. The treated zone appears in black (R1-R2-R3-R4-part of R5). Respective treatments with treatment fluid and brine were flowed from right to left in the diagram shown, and brine was backflowed from left to right.

The experiment was repeated at T=60° C., for which data are shown in FIGS. 8A and 8B. Brine permeability in the treated zone was reduced by 33.5%. The biggest damage appeared near the wellbore (regions 1) where the reduction was 60%.

These data indicate that high temperature does not prevent formation of significant precipitation.

Example 8

Abietate in Pure Diesel

Figure 9:
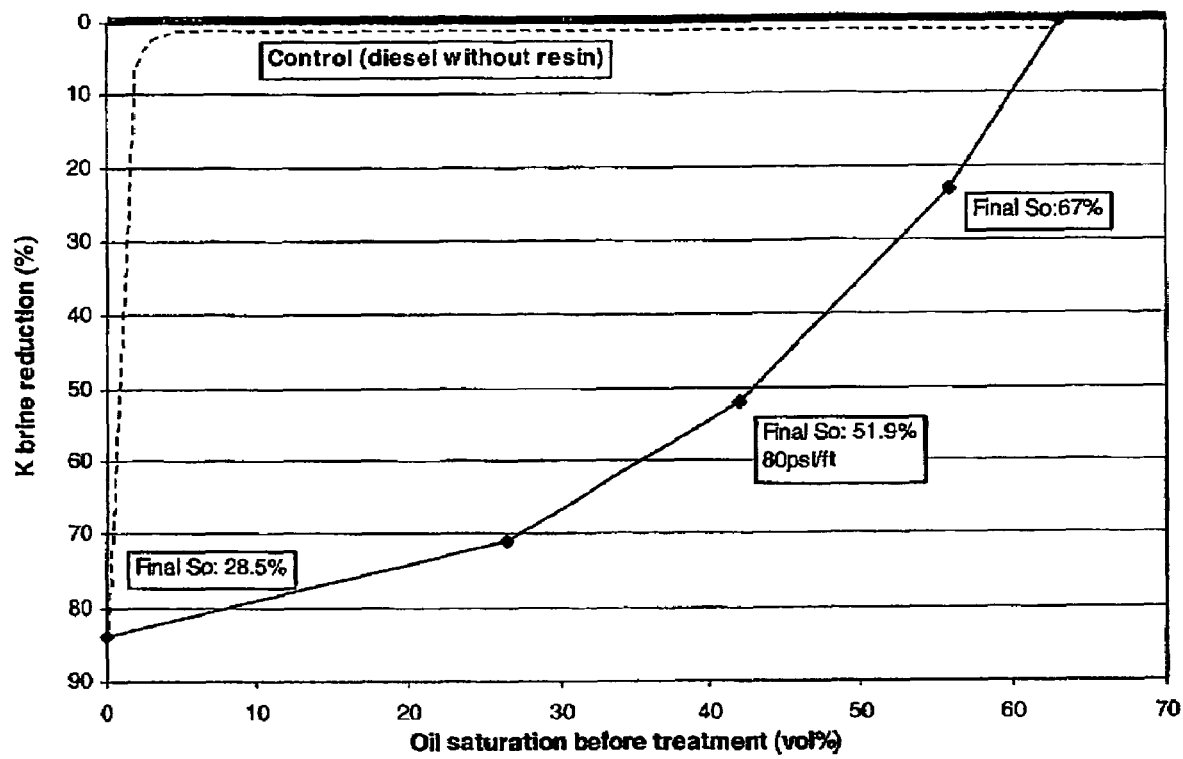
FIG. 9 shows the result of an experiment to illustrate brine permeability reduction (in a water zone) variation versus residual oil saturation in core prior to treatment with the treatment fluid being 30 wt % calcium abietate in diesel. T=50° C.

The plot of FIG. 9 deals with the performance in water zones at 50° C. (Berea sandstone, k 100-150 mD; brine: 5 wt % $NH_4Cl$ in DI water) of the oil-based system (no miscibility with water/brine). The system contained 30 wt % calcium abietate dissolved in diesel.

Good clean-up was observed in oil zones with % retained $k_{oil}$ in the range 85-100%. The above plot shows the brine permeability reduction variation in water zones versus the residual oil saturation present in core prior to the treatment. A reduction of $k_{brine}$ was observed in the water zones. The damage in the water zone was a function of the oil saturation prior to treatment. The higher So, the lower the damage; typically, $\geq$70% $k_{brine}$ reduction was obtained for the So(pre-treatment) range 0-25%. Since the brine and diesel-based treatment fluid are immiscible, it is unlikely that the precipitation of waxy solids accounts for the damage observed. Whilst it is possible that some minor precipitation may occur at interfaces, we suspect a viscous oil or viscous interface effect may be playing a role in reducing $k_{brine}$ after backflow to steady-state. It can be assumed that the oil saturation after backflow is significantly higher than that prior to the treatment resulting in a decrease in $k_{brine}$ via a relative permeability effect.

Example 9

Phenolic-Modified Resin Example

Figure 10:
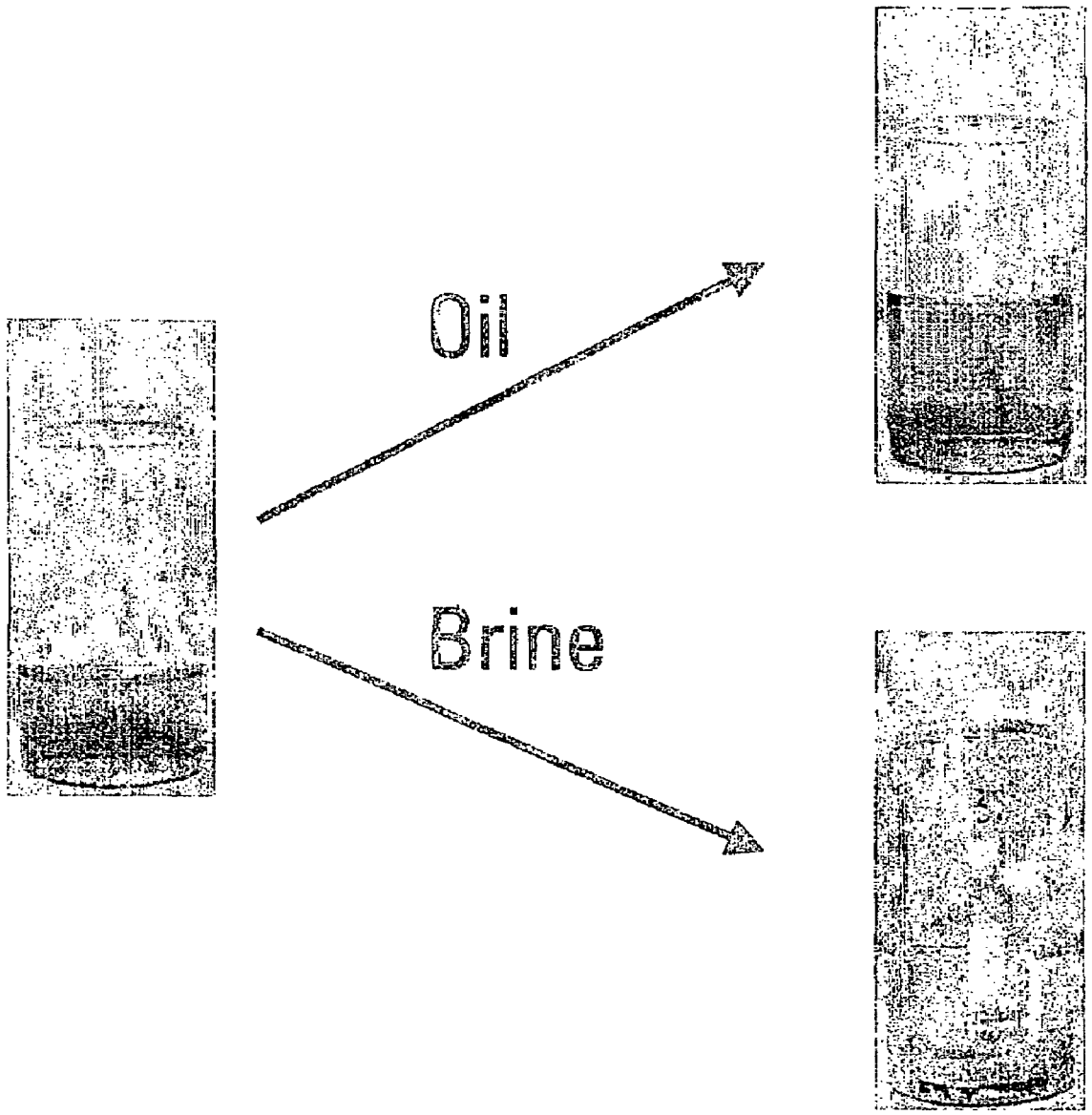
FIG. 10 shows the result of an experiment to illustrate selective precipitation of a phenolic-modified resin (RESENOL™ 9070) from a treatment fluid consisting of 33 wt % RESENOL™ 9070 dissolved in DPM. The addition of oil merely dilutes the treatment fluid, whereas the addition of brine causes the formation of a heavy waxy solid precipitate.

FIG. 10 shows the selective precipitation of a phenolic-modified resin (Resenol 9070) from a treatment fluid consisting of 33 wt % Resenol 9070 dissolved in DPM. The addition of oil (Halpasol—see description given in footnote of Table 1)

to the fluid at an oil:treatment fluid volume ratio of 1:1 merely dilutes the treatment fluid (no precipitation was observed). Note that the oil and the treatment fluid are miscible. However, the addition of brine (1 mol/L NaCl solution) to the fluid at a brine:treatment fluid volume ratio of 1:1 causes the formation of a heavy waxy solid precipitate.

Example 10

Candidate Precursor Molecules

In the first and third treatment scenarios described above in the summary of the invention, the use of a water-soluble or solvent-soluble precursor compound is proposed. After placement, the precursor compound degrades to form the α-branched carboxylate anion, which can then combine with divalent or trivalent cations to form the precipitate.

Figure 11:
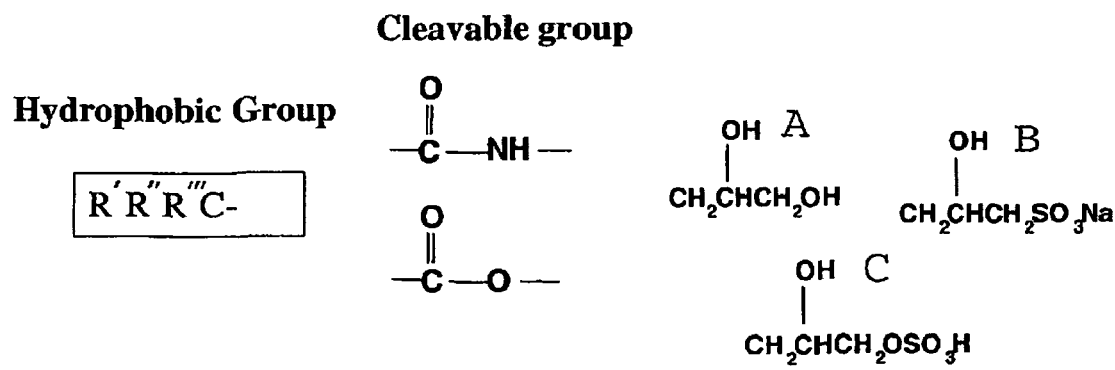
FIG. 11 shows groups present in precursor molecules. A hydrophobic group R'R"R'"C— (left) is linked through a cleavable amide or ester group (centre) to a water-soluble group A, B or C(right).
Figure 12:
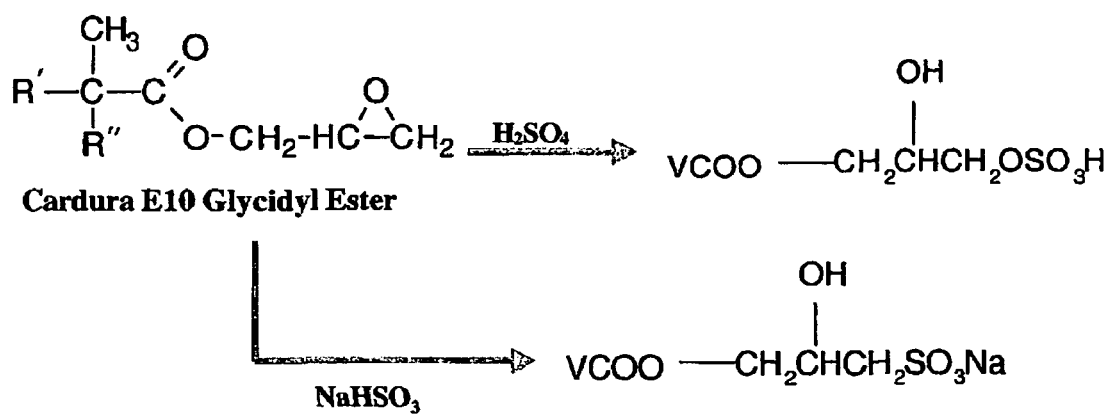
FIG. 12 shows reactions to form water-soluble derivatives (right) of Cardura E10 glycidyl ester (left). "V" is the R'R"CH$_3$C— hydrophobic group. The products are suitable water-soluble precursor molecules which can be degraded to produce the VCOO$^-$ anion which can then precipitate by interaction with, for example, calcium or magnesium ions.
Figure 13:
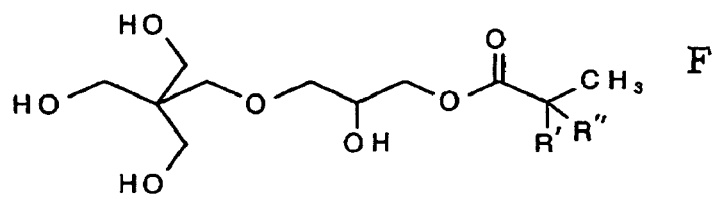
FIG. 13 shows cardura E10P-TMP mono adduct (F). This is another example of a water-soluble precursor compound which can be degraded to produce the R'R"CH$_3$CCOO$^-$ anion which can then precipitate by interaction with, for example, calcium or magnesium ions.

FIGS. 11, 12 and 13 outline some of the candidate precursor molecules (A to P) that could be used to release a precipitating group such as a neo-decanoate anion. In FIG. 11, water-soluble moieties (labelled A, B and C, respectively) linked through a cleavable group (shown as an amide or ester linkage) to a hydrophobic group (shown in FIG. 11 as R'R"R'"C), to form precursors A, B and C respectively.

Cardura E10 Glycidyl ester shown in FIG. 12 (commercially available from Resolution Performance Products) is itself soluble in mutual solvents but it can be converted to water-soluble derivatives such as the diol, polyol (Cardura E10P-TMP), sulphate or sulphonate derivatives. Two such derivatives (candidate precursors D and E) are shown in FIG. 12. "V" represents the hydrophobic group. Such precursors can then by hydrolysed to release a precipitating group such as a neo-decanoate anion under reservoir conditions.

FIG. 13 shows the cardura E10P-TMP mono adduct (candidate precursor F).

Figure 14:
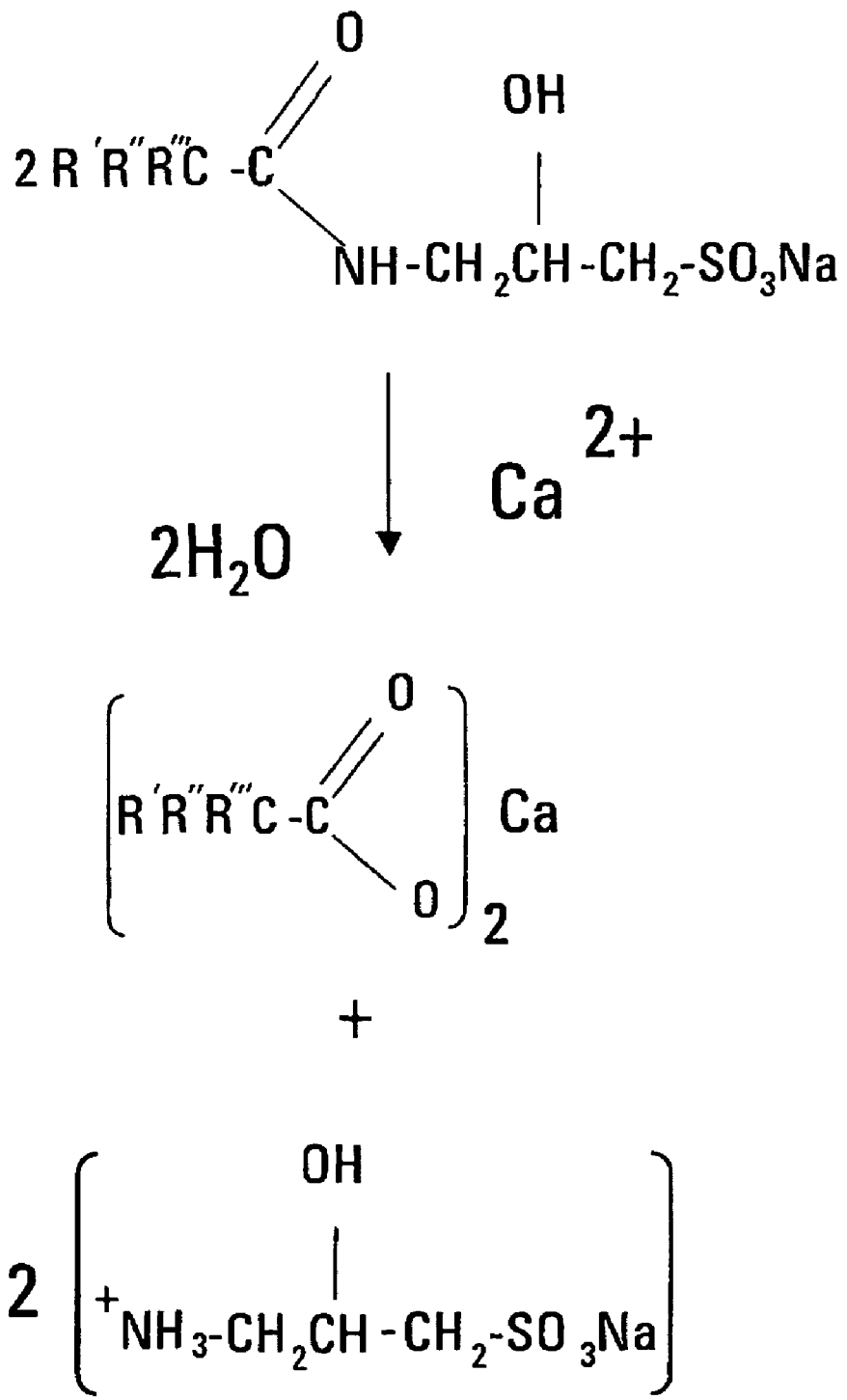
FIG. 14 shows an example of a degradation mechanism for precursor molecule A.
Figure 15:
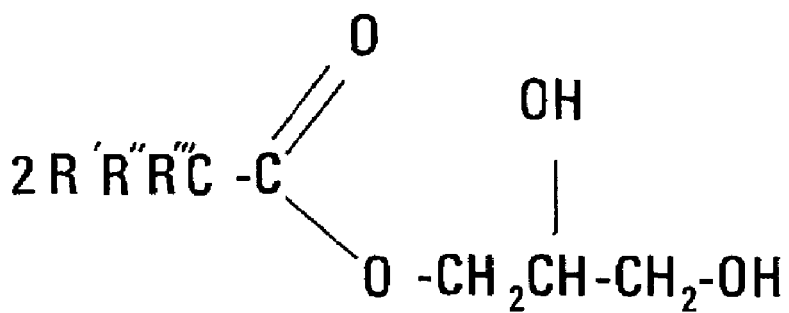
FIG. 15 shows an example of a degradation mechanism for precursor molecule C.
Figure 15:
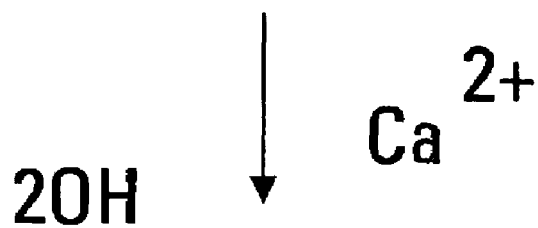
Figure 15:
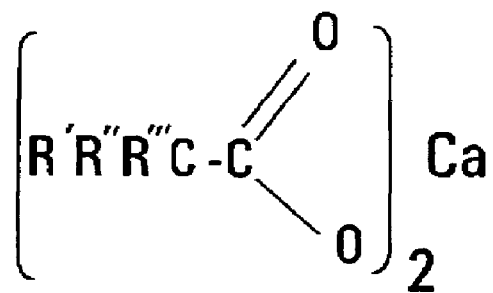
Figure 15:
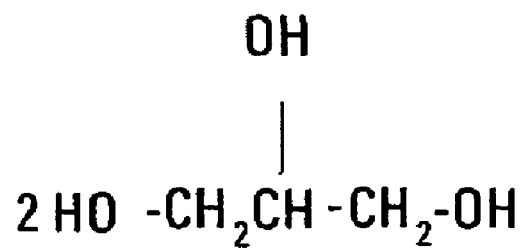

FIGS. 14 and 15 show examples of a degradation mechanism for solvent-soluble precursor molecules A and C, respectively, where the cleavable linkage is an ester. The degradation mechanism is hydrolysis. The resulting carboxylate combines with $Ca^{2+}$ present in formation water during backflow, to form the calcium carboxylate salt, a waxy solid.

Example 11

Mutual Solvents

Examples of mutual solvents and hydrophile-lipophile balance numbers (HLB) are shown in Tables 4 and 5 below.

TABLE 4

Examples of mutual solvents

| Solvent | | Structure |
|---|---|---|
| IUPAC name | 1-butoxy-3-propanol | |
| Common name | Propylene glycol monobutyl ether | |
| Abbreviation | DOWANOL™ PnB | |

TABLE 4-continued

Examples of mutual solvents

| Solvent | | Structure |
|---|---|---|
| IUPAC name | 2-butoxy-ethanol | |
| Common name | Ethylene glycol monobutyl ether | |
| Abbreviation | DOWANOL™ EB | |
| IUPAC name | 1-(2-methoxy-isopropoxy)-2-propanol | |
| Common name | Dipropylene glycol methyl ether | |
| Abbreviation | DOWANOL™ DPM | |

TABLE 5

Details of mutual solvents

| Name (abbreviation - see Table 4) | DOWANOL PnB | DOWANOL EB (U66) | DOWANOL DPM |
|---|---|---|---|
| Formula | C7H16O2 | C6H14O2 | C7H16O3 |
| Melting point (° C.) | <-80 | -74.8 | -83 |
| Boiling point (° C.) | 171 | 168.4 | 188.3 |
| Flash point (° C.) | 63 | 65 | 75 |
| Density (g/cm$^3$) | 0.879 | 0.902 | 0.953 |
| Deionised water solubility (wt % at 25° C.) | 5.5 | 100 | 100 |
| HLB number[1] | 6.88 | 7.35 | 8.18 |
| Hildebrand parameter[2] (cal/cm$^3$)$^{1/2}$ | 9.3 | 10.2 | 9.6 |

Footnotes to Table 5:
[1] The Hydrophile-Lipophile Balance number (HLB) was calculated according to the Davies' rule and extracted from Surfactants and polymers in Aqueous Solution, Jonsson, Lindman, Holmberg, Kronberg, Wiley edition, Chapter 17, Table 17.1 page 353.
[2] The Hildebrand solubility parameter was developed by. J. H. Hildebrand and R. L. Scott in Solubility of Nonelectrolytes, Dover Publication, Chapter XXIII, page 424.

Figure 16:
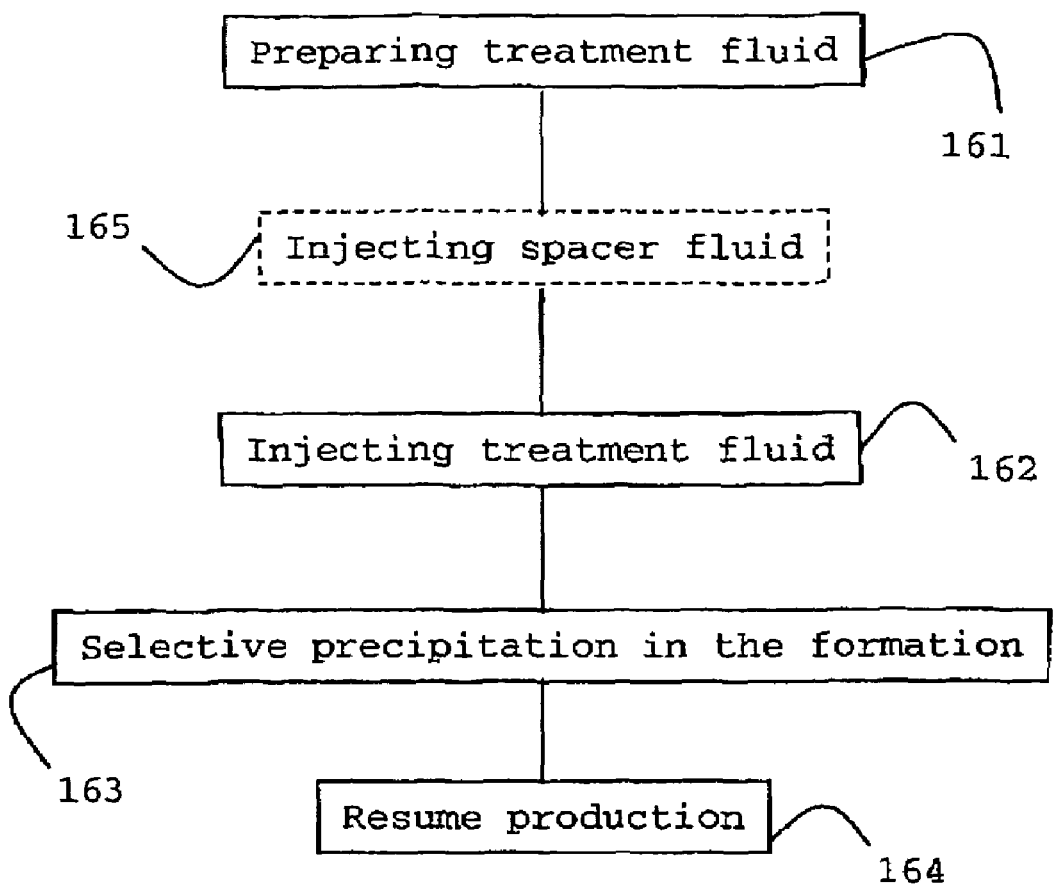
FIG. 16 is a block diagram of steps in accordance with a method of the present invention.

The block diagram of FIG. 16 illustrates the steps taken to reduce the water extracted from a production well bore that traverses hydrocarbon-bearing formations. Usually production is stopped and in a first step 161 a well bore treatment fluid is prepared for injection. The preparation may be made at the site of the well bore using pre-formulations of the components of the fluid or the fluid is delivered essentially fully prepared to the site.

The fluid is then in step 162 injected either directly ("bullheaded") or through a suitable conveyance tool, such as coiled tubing, into the well bore. In step 163, pressure is used to let the injected fluid permeate the formation to form precipitates when the solvent ratio is reduced through the presence of formation water.

After the treatment 164, the pressure in the well bore is lowered to backflow and resume production. The treatment may include the step 165 of injecting prior to the treatment fluid a spacer fluid that delays the precipitation and allowing the treatment fluid to permeate deeper into the formation.

The invention claimed is:

1. A method of reducing the outflow of water during recovery of hydrocarbons from a hydrocarbon reservoir in a formation, comprising:
    (a) providing a non-aqueous well bore treatment fluid based on a liquid selected from oil or a mixture of oil and solvent such that said treatment fluid is not fully miscible with water, said treatment fluid containing 5 to 40 weight per cent of a water-immiscible dissolved compound based on α-branched carboxylic acid, derivatives or co-polymers thereof, and capable of forming a precipitate that is soluble in hydrocarbons and insoluble in water, and
    (b) injecting said non-aqueous treatment fluid into a well bore; and
    (c) letting the non-aqueous fluid permeate formation surrounding the well bore
    (d) causing or allowing water or brine to mix with the non-aqueous fluid within the formation, to form a said precipitate therein and reduce the outflow of water therefrom.

2. A method according to claim 1, further comprising the step of injecting acid into the well bore.

3. A method according to claim 1, further comprising the step of delaying precipitation.

4. A according to claim 3, wherein precipitation is delayed by injecting a spacer fluid into the formation before the treatment fluid.

5. A method according to claim 1, further comprising the step of injecting water or brine into the formation.

6. A method according to claim 1, further comprising the step of reversing flow direction in the well bore to resume hydrocarbon production.

7. The method of claim 1 wherein the well bore treatment fluid is oil-based.

8. The method of claim 1 wherein the well bore treatment fluid is based on a mixture of solvent and oil.

9. The method of claim 1 further comprising a step of injecting a spacer fluid without said water-immiscible dissolved compound into the formation before the treatment fluid.

10. The method of claim 9 wherein the spacer fluid is selected from oil or a mixture of oil and solvent such that said spacer fluid is not fully miscible with water.

11. The method of claim 1 wherein said reservoir comprises a plurality of oil-producing layers.

12. The method according to claim 1, wherein the precipitate is soluble to at least 5.0 wt % in hydrocarbons.

13. The method according to claim 12, wherein the precipitate is soluble to at least 10.0 wt % in hydrocarbons.

14. The method according to claim 1, wherein the precipitate is less than 1.0 wt % soluble in water.

15. The method according to claim 14, wherein the precipitate is less than 0.10 wt % soluble in water.

16. The method according to claim 1, wherein the melting point of the precipitate is over 50° C.

17. The method according to claim 16, wherein the melting point of the precipitate is over 100° C.

18. The method according to claim 1, wherein the precipitate is a divalent or trivalent metal salt of an α-branched carboxylic acid.

19. The method according to claim 18, wherein the precipitate has the structure:

wherein:
    $R_1$ is a $C_{30}$-$C_5$ aliphatic group having a $C_{20}$-$C_4$ linear chain bonded at a terminal carbon atom thereof (the α carbon atom) to the carbon atom of the carboxyl (COO) group, and further having at least one $C_1$, $C_2$ or $C_3$ side group bonded to said terminal carbon atom, and
    M is a divalent or trivalent metal cation.

20. A well bore treatment fluid The method according to claim 19, wherein two of said side groups are bonded to said terminal carbon atom.

21. The method according to claim 19, wherein the precipitate has the structure:

wherein:
    $R_2$ is a $C_{10}$-$C_{30}$ cyclyl group bonded at a carbon atom thereof (the α carbon atom) to the carbon atom of the carboxyl (COO) group, and having at least one $C_1$, $C_2$ or $C_3$ side group bonded to the α carbon atom, and
    M is a divalent or trivalent metal cation.

22. The method according to claim 21, wherein $R_2COO^-$ is an abietate group.

23. The method according to claim 1, wherein the compound is immiscible in a solvent fully miscible with water.

24. The method according to claim 1, wherein the α-branched carboxylic acid is abietic acid.

25. The method according to claim 1, wherein the precipitate is a divalent or trivalent metal salt of abietic acid.

26. The method according to claim 24, wherein the precipitate is polymerised abietic acid.

27. The method according to claim 24, wherein the precipitate is a divalent or trivalent metal salt of polymerised abietic acid.

28. The method according to claim 24, wherein the precipitate is a phenolic co-polymer of abietic acid.

29. The method according to claim 1, wherein the dissolved compound is a divalent or trivalent metal salt.

30. The method according to claim 29, wherein the divalent metal is selected from the group consisting of calcium, magnesium and zinc.

31. The method according claim 1, wherein said dissolved compound is a precursor, the precursor being degradable to form the carboxylate anion of a divalent or trivalent metal salt.

32. The method according to claim 1, wherein the precipitate has the structure:

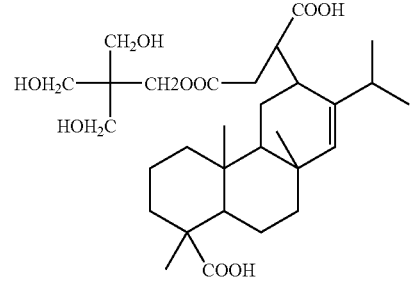

33. The method according to claim 1, wherein the precipitate has the structure:

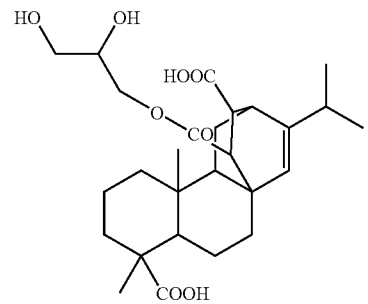

34. The method according to claim 1, wherein the precipitate has the structure:

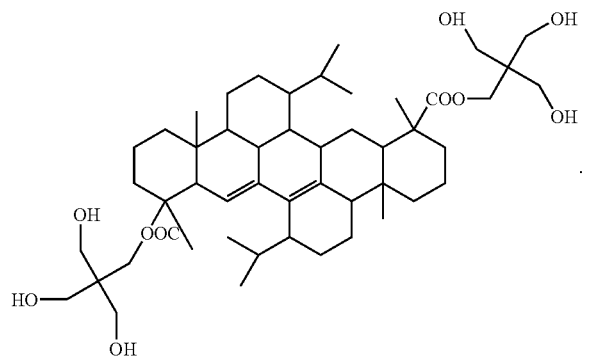

35. A method of reducing the outflow of water during recovery of hydrocarbons from a hydrocarbon reservoir in a formation, comprising:

(a) providing a non-aqueous well bore treatment fluid based on a liquid selected from oil or a mixture of oil and solvent such that said treatment fluid is not fully miscible with water, said treatment fluid containing 5 to 40 weight per cent of a water-immiscible dissolved compound based on α-branched carboxylic acid, derivatives or co-polymers thereof, and capable of forming a precipitate that is soluble in hydrocarbons and insoluble in water, and (b) injecting said non-aqueous treatment fluid into a well bore;

(c) injecting water or brine into the wellbore; and (d) letting the non-aqueous treatment fluid permeate a formation surrounding the well bore to form precipitate in the presence of water or brine in the formation or the injected water or brine to reduce the outflow of water from the formation.

36. The method of claim further comprising a step of injecting a spacer fluid without said water-immiscible dissolved compound into the formation before the treatment fluid.

* * * * *